(12) United States Patent
Zhang et al.

(10) Patent No.: US 11,423,508 B2
(45) Date of Patent: Aug. 23, 2022

(54) METHOD AND SYSTEM OF POINT CLOUD REGISTRATION FOR IMAGE PROCESSING

(71) Applicant: INTEL CORPORATION, Santa Clara, CA (US)

(72) Inventors: Yimin Zhang, Beijing (CN); Haibing Ren, Beijing (CN); Wei Hu, Beijing (CN); Ping Guo, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/770,320

(22) PCT Filed: Feb. 26, 2018

(86) PCT No.: PCT/CN2018/077179
§ 371 (c)(1),
(2) Date: Jun. 5, 2020

(87) PCT Pub. No.: WO2019/161558
PCT Pub. Date: Aug. 29, 2019

(65) Prior Publication Data
US 2020/0388004 A1 Dec. 10, 2020

(51) Int. Cl.
*G06T 3/00* (2006.01)
*G06T 7/33* (2017.01)

(52) U.S. Cl.
CPC ............ *G06T 3/0075* (2013.01); *G06T 7/337* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 2004/0001620 A1 | 1/2004 | Moore et al. | |
| 2009/0009513 A1* | 1/2009 | van den Hengel | G06K 9/00 345/420 |
| 2013/0107010 A1* | 5/2013 | Hoiem | G06K 9/46 348/47 |
| 2016/0026266 A1* | 1/2016 | Douglas | A61B 6/466 345/157 |
| 2016/0171735 A1 | 6/2016 | Wu et al. | |
| 2016/0321838 A1* | 11/2016 | Barone | G06T 5/50 |
| 2017/0343356 A1* | 11/2017 | Roumeliotis | G01C 21/32 |
| 2018/0158200 A1* | 6/2018 | Metzler | G06T 7/38 |

(Continued)

FOREIGN PATENT DOCUMENTS

| | | |
|---|---|---|
| CN | 104240280 | 12/2014 |
| CN | 104700451 | 6/2015 |

(Continued)

OTHER PUBLICATIONS

H. Jiang and J. Xiao, "A Linear Approach to Matching Cuboids in RGBD Images," 2013 IEEE Conference on Computer Vision and Pattern Recognition, 2013, pp. 2171-2178, doi: 10.1109/CVPR.2013.282. (Year: 2013).*

(Continued)

*Primary Examiner* — James A Thompson
(74) *Attorney, Agent, or Firm* — Essential Patents Group, LLP.

(57) ABSTRACT

A system, article, and method of point cloud registration using overlap regions for image processing.

25 Claims, 14 Drawing Sheets

(56) References Cited

U.S. PATENT DOCUMENTS

2018/0315221 A1\* 11/2018 Jones ............... G06K 9/6807
2019/0096086 A1\* 3/2019 Xu .................... G01S 7/417

FOREIGN PATENT DOCUMENTS

| CN | 105701820 | 6/2016 |
|----|-----------|--------|
| CN | 105976312 | 9/2016 |
| CN | 106023298 | 10/2016 |

OTHER PUBLICATIONS

International Search Report and Written Opinion for International Patent Application No. PCT/CN18/77179, dated Nov. 23, 2018.
Abbeel, "Particle Filters", UC Berkeley EECS (Nov. 2012) people.eecs.berkeley.edu/~pabbeel/cs287-fa12/slides/particlefilters.pdf.
Bergstrom, et al., "Robust registration of point sets using iteratively reweighted least squares", Computational Optimization and Applications, 58 (3): 543-561 (2014).
Besl, P. et al., "A Method for Registration of 3-D Shapes", IEEE Transactions on Pattern Analysis and Machine Intelligence vol. 14, No. 2, Feb. 2, 1992, pp. 239-256 (18 pages).
Castellani, U. et al., "3D shape registration", 3D Imaging, Analysis, and Applications, 2012.
Chetverikov, et al., "Robust Euclidean alignment of 3D point sets: the trimmed iterative closest point algorithm", Image and Vision Computing 23 (3): 299-309 (2005).
Collins, R.."Lecture 12: Camera Projection Reading: T&V Section 2.4", CSE 486 Computer Vision I, Introduction to Computer Vision, Penn. State, www.cse.psu.edu/~rtc12/CSE486/lecture12.pdf (2007).
Coughlan, et al., "The Manhattan World Assumption: Regularities in scene statistics which enable Bayesian inference", Advances in Neural Information Processing Systems 12 (NIPS 2000).
Eigen, D. et al., "Depth Map Prediction from a Single Image using a Multi-Scale Deep Network", Dept. of Computer Science, Courant Institute, New York University, 2014: 2366-2374.
Flint, C. et al., "A dynamic programming approach to reconstructing building interiors", ECCV, 2010.
Gold, et al., "New algorithms for 2D and 3D point matching: Pose estimation and correspondence", Advances in Neural Information Processing Systems, pp. 957-964 (1995).
Grant, et al., "Point-to-plane registration of terrestrial lasers scans", ISPRS Journal of Photogrammetry and Remote Sensing, 72: 16-26 (2012).
Karsch, K. et al., "Depth Extraction from Video Using Non-parametric Sampling", European Conference on Computer Vision, Springer, Berlin, Heidelberg, 2012: 775-788.
Langer, M. et al., "World vs. Camera Coordinates", University of McGill, Center of Intelligent Machines, COMP 558, Lecture 4, www.cim.mcgill.ca/~langer/558/4-cameramodel.pdf (2010).
Ma, Y. et al., "Fast and Accurate Registration of Structured Point Clouds with Small Overlaps", CVPR Workshop, 2016.
Nobili, S. et al., "Overlap-based ICP Tuning for Robust Localization of a Humanoid Robot", ICRA 2017.
Segal, A. et al., "Generalized-ICP", Proceedings of Robotics: Science and Systems (RSS), 2009.
Serafin, J. et al., "NICP: Dense normal based point cloud registration", IROS, pp. 742-749, 2015.
Shotton, J. et al., "Scene coordinate regression forests for camera relocalization in rgb-d images", Proceedings of the IEEE Conference on Computer Vision and Pattern Recognition, 2013, pp. 2930-2937.
Tombari, et al., "Unique Signatures of Histograms for Local Surface Description", ECCV 2010, Part III, LNCS 6313, pp. 356-369 (2010).
Yang, J. et al., "Go-ICP Solving 3d registration efficiently and globally optimally", ICCVm pp. 1457-1464, 2013.
Zhang, K. et al., "Cross-Scale Cost Aggregation for Stereo Matching", Computer visiona and Pattern Recognition, IEEE 2014, pp. 1590-1597.
Zhuo, Y et al., "Automatic registration of partial overlap three-dimensional surfaces", Proceedings of the International Conference on Mechanic Automation and Control Engineering, pp. 299-302, 2010.
Zucconi, alanzucconi.com/2015/09/16/how-to-sample-from-a-gaussian-distribution.
International Preliminary Report on Patentability for PCT Application No. PCT/CN2018/077179, dated Sep. 3, 2020.

\* cited by examiner

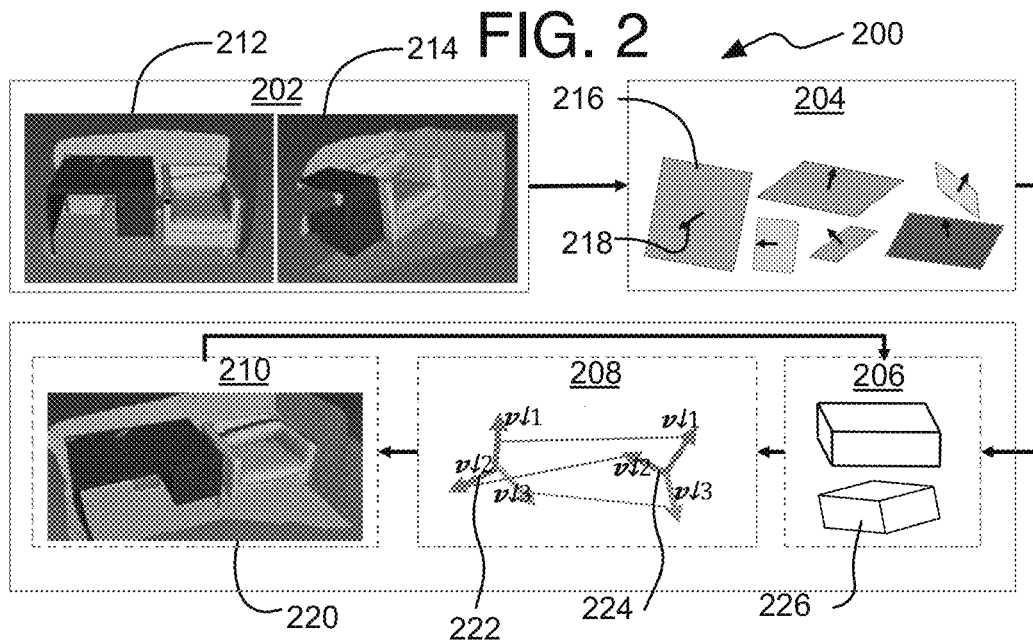

OBTAIN IMAGE DATA OF MULTIPLE IMAGES OF THE SAME SCENE FROM ONE OR MORE CAMERAS AND INCLUDING A FIRST IMAGE AND A SECOND IMAGE EACH RESPECTIVELY BEING ASSOCIATED WITH A FIRST POINT CLOUD AND A SECOND POINT CLOUD SEPARATELY FORMING THE SCENE 302

GENERATE THREE-DIMENSIONAL FIRST AND SECOND OVERLAP REGIONS EACH RESPECTIVELY ENCLOSING POINTS FROM, AND HAVING A POSITION AND DIMENSIONS IN, THE RESPECTIVE FIRST AND SECOND POINT CLOUD 304

ITERATIVELY MODIFY THE POSITION OR DIMENSIONS OR BOTH OF THE FIRST AND SECOND OVERLAP REGIONS TO GENERATE BEST FIRST AND SECOND OVERLAP REGIONS SO FAR OF EACH ITERATION AND UNTIL A CONVERGENCE CRITERIA IS MET 306

ESTABLISHING A TRANSFORMATION AT LEAST PARTIALLY BASED ON THE BEST OVERLAP REGIONS, AND THE TRANSFORMATION COMPRISING A ROTATION PART, A TRANSLATION PART, OR BOTH TO CONVERT POINT LOCATIONS BETWEEN THE POINT CLOUDS OF THE FIRST AND SECOND POINT CLOUDS 308

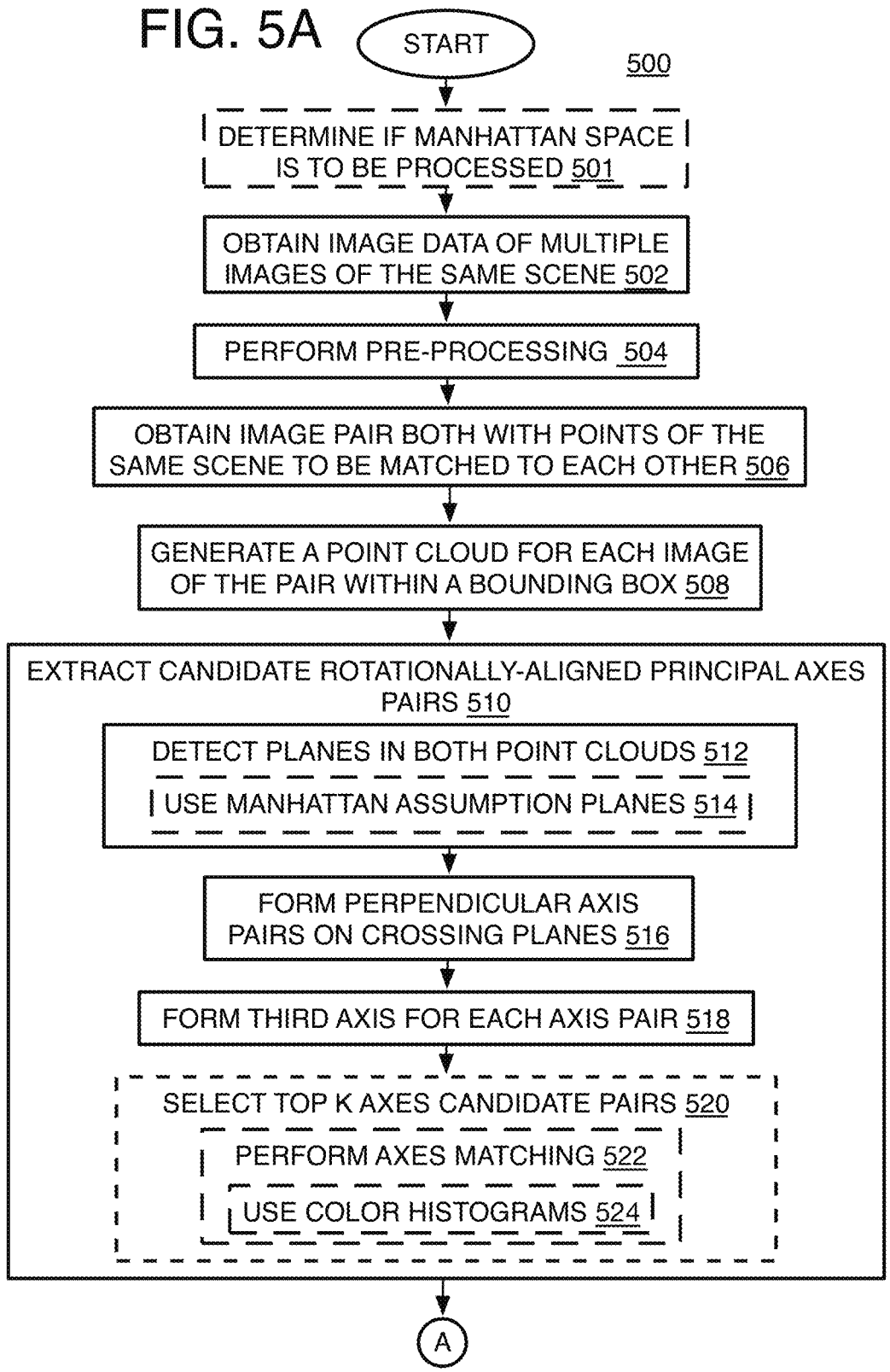

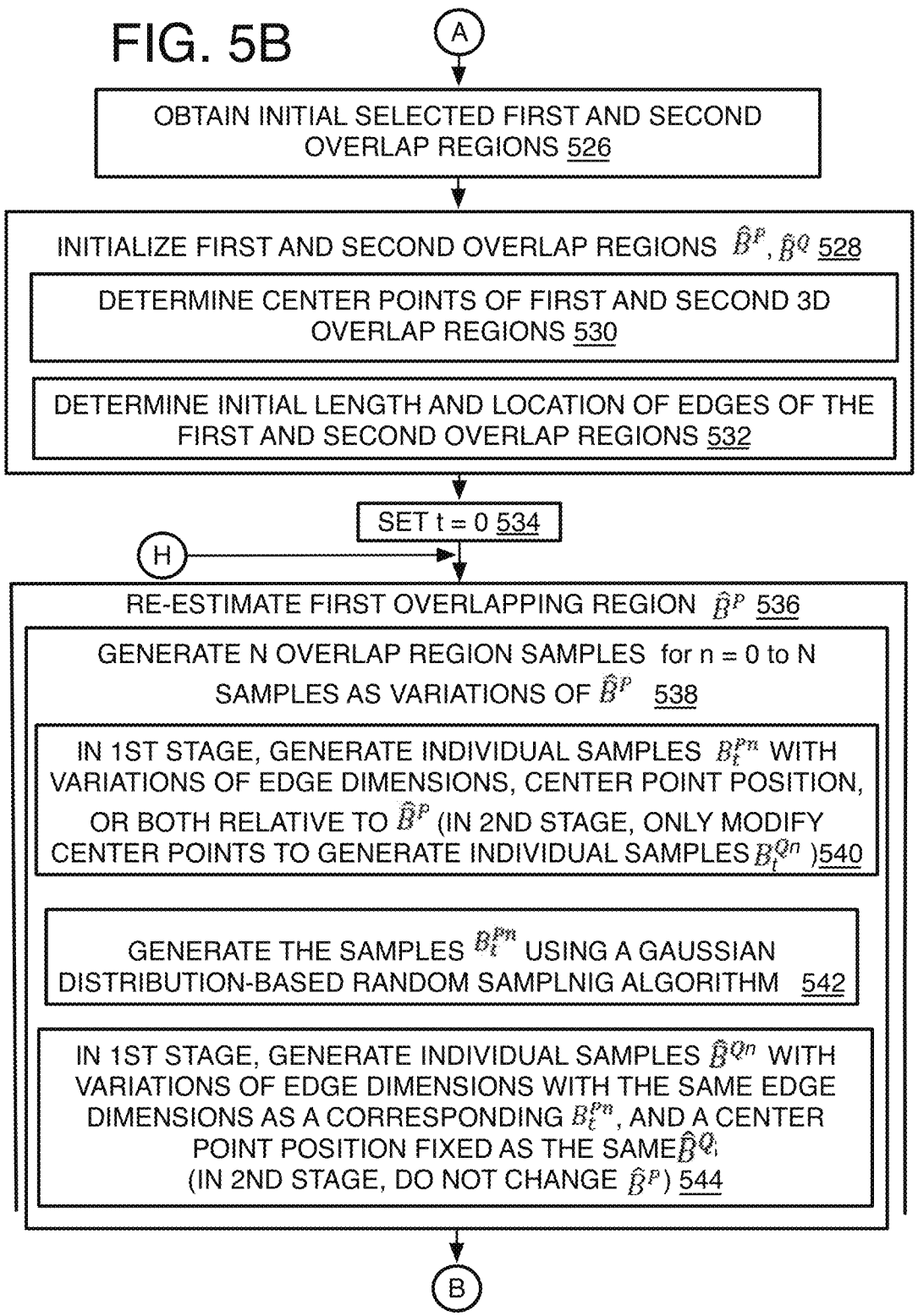

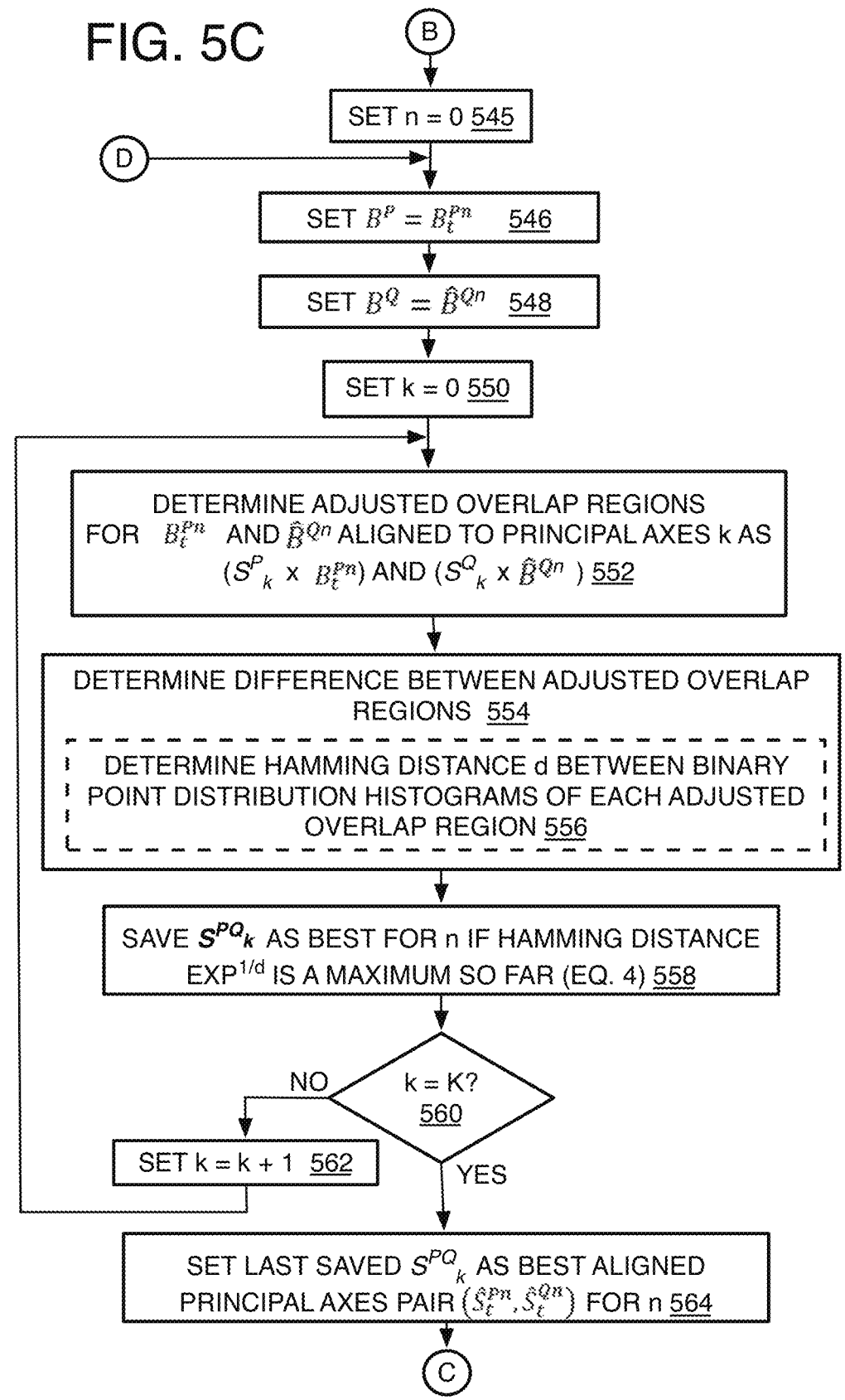

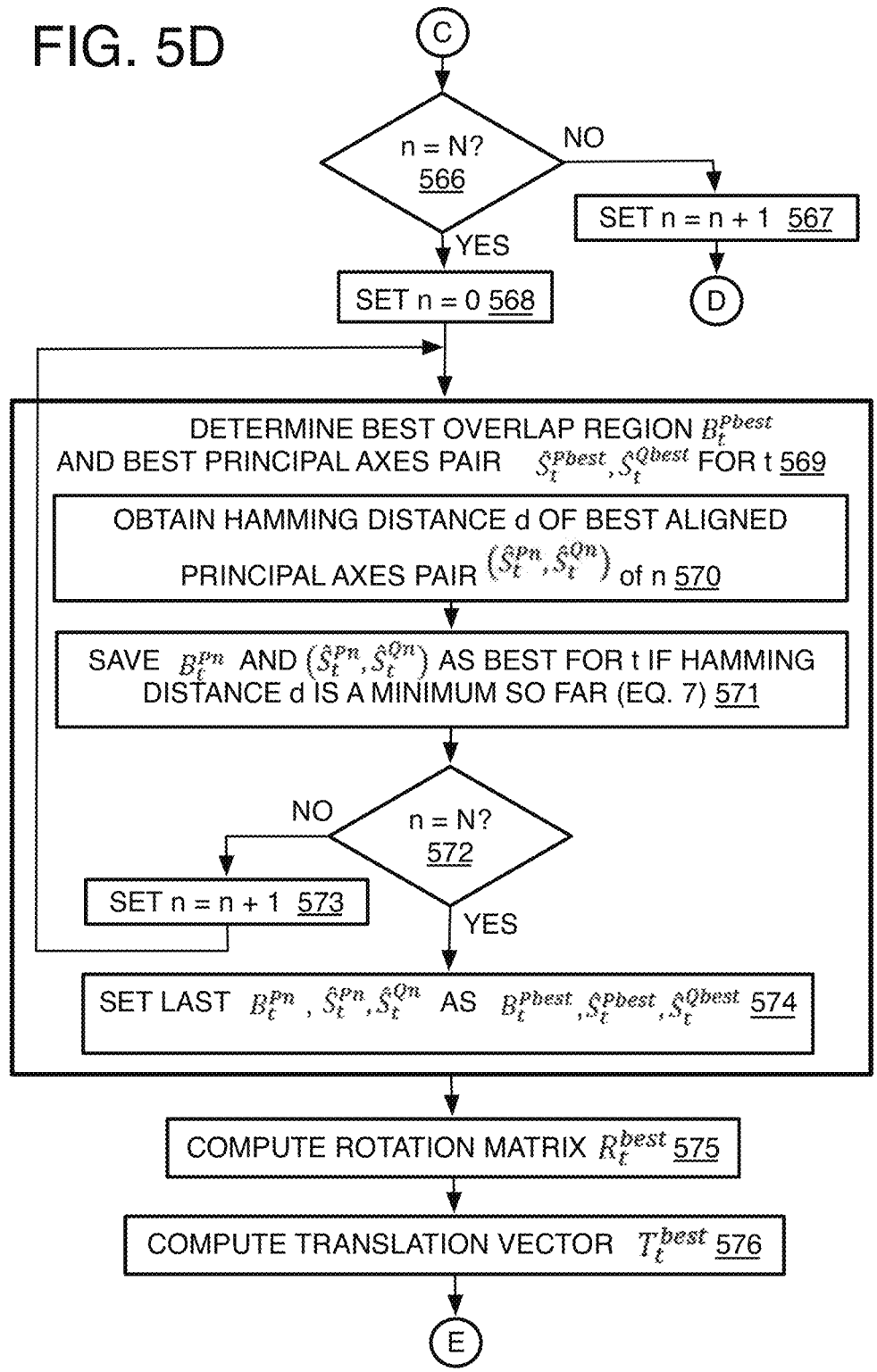

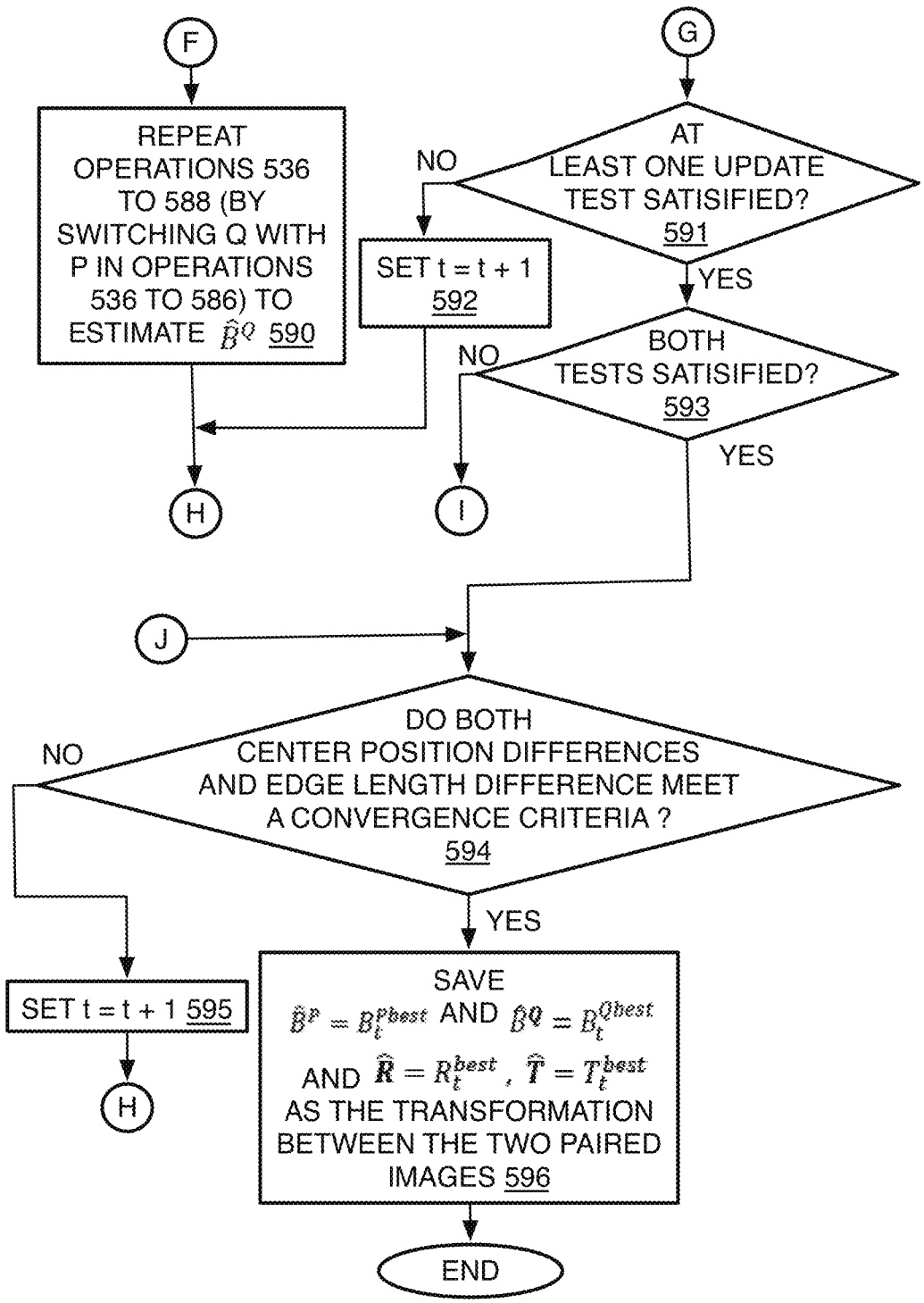

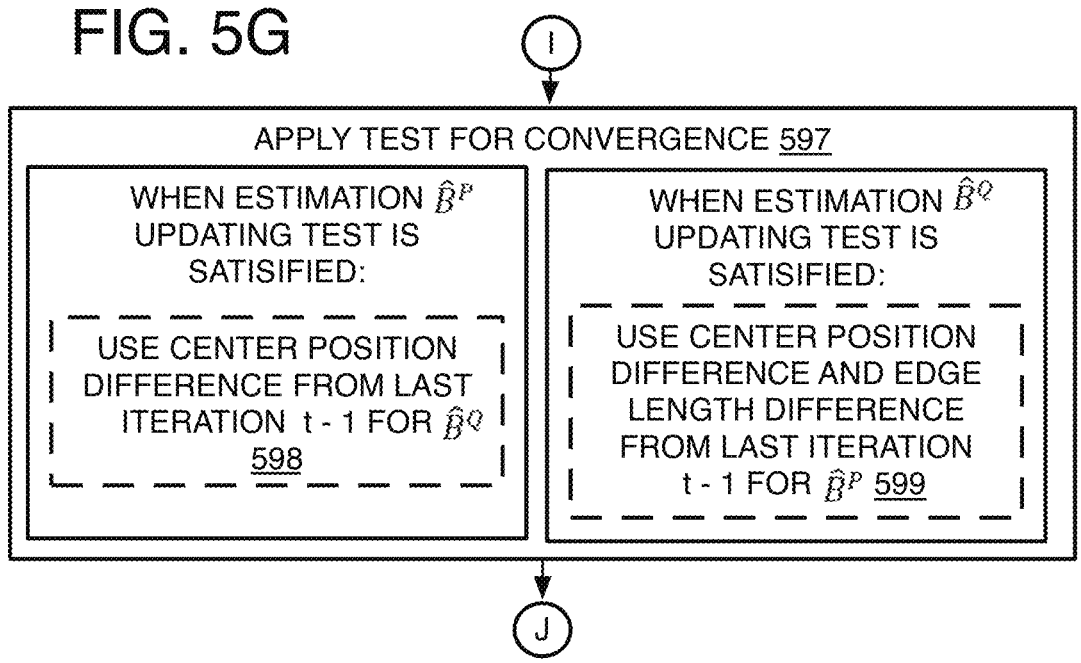

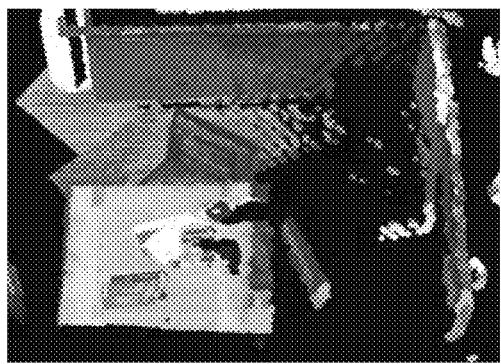
FIG. 6 ~600
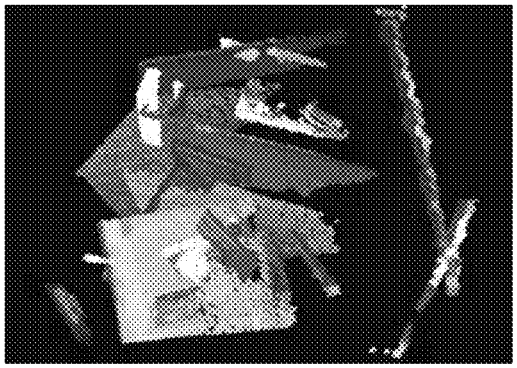
FIG. 7 ~700
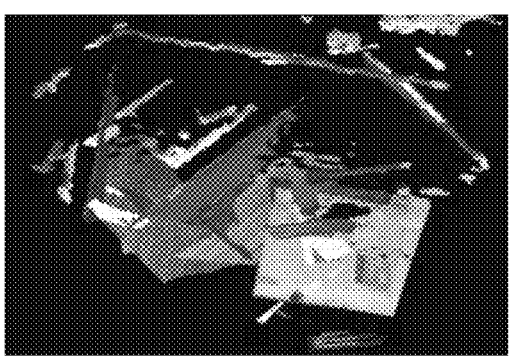
FIG. 8 ~800
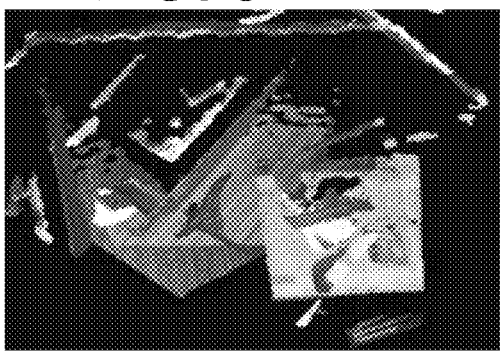
FIG. 9 ~900
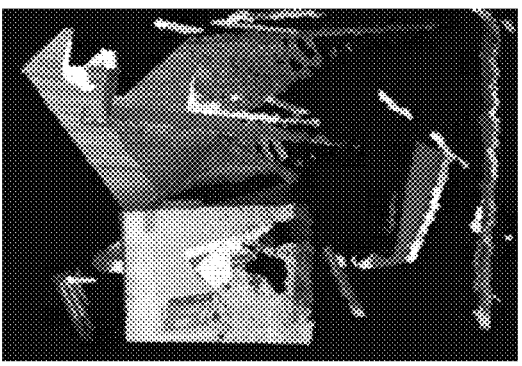
FIG. 10 ~1000
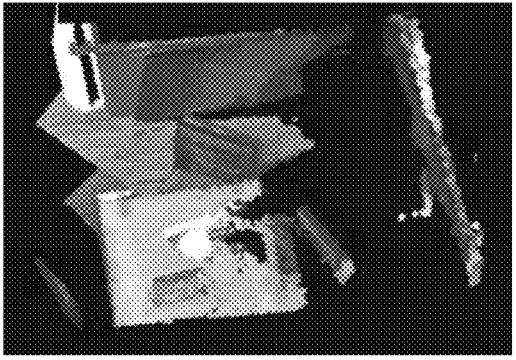
FIG. 11 ~1100

METHOD AND SYSTEM OF POINT CLOUD REGISTRATION FOR IMAGE PROCESSING

CLAIM OF PRIORITY

This Application is a National Stage Entry of, and claims priority to, PCT Application No. PCT/CN2018/077179, filed on Feb. 26, 2018 and titled "METHOD AND SYSTEM OF POINT CLOUD REGISTRATION FOR IMAGE PROCESSING", which is incorporated by reference in its entirety for all purposes.

BACKGROUND

Camera arrays, which may be provided on tablets or smartphones for example, may be provided to capture multiple images of the same scene except from different angles. This same effect is achieved with a single camera that is moved to capture images of the same scene from different angles. These images can then be used to generate a depth map, and in turn, 3D geometric or semantic models in order to accurately locate objects in a 3D space of the scene. This is performed so that objects in the scene, or distances between objects in the scene (or from the camera to the object) can be measured, for computer vision, artificial intelligence, object recognition, head mounted 3D displays (HMDs) or point of view displays, and otherwise whenever it is desirable to know the size, position, or identity of an object in a scene.

Many such conventional systems generate a point cloud for each image and then match the points from different images of the scene except from the different angles. Once such points are matched, triangulation or other algorithms can be used to measure depth from the camera to the points and other measurements. This is often performed using an iterative closest point (ICP) method. These methods, however, are typically inaccurate for systems that compare images along a sequence of frames generated from a moving camera. When the motion from one camera position to the next is too large, the system cannot accurately determine the correct corresponding point pairs, resulting in a high error rate. Such systems also are too slow since each iteration usually includes computations with all of the points in the point clouds being registered, which may result in pauses when a user views the images or delays when automatic actions are to be performed based on location and/or identification of 3D objects in the scene.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow diagram of a method of point cloud registration in accordance with at least one of the implementations disclosed herein;

FIG. 3 is a flow chart of a method of point cloud registration for image processing in accordance with at least one of the implementations disclosed herein;

FIGS. 5A-5G is a detailed flow chart of a method of point cloud registration for image processing in accordance with at least one of the implementations disclosed herein;

FIG. 6 is an image of a resulting reconstructed scene using point cloud matching of a conventional method;

FIG. 7 is an image of a resulting reconstructed scene using point cloud matching of a conventional method;

FIG. 8 is an image of a resulting reconstructed scene using point cloud matching of a conventional method;

FIG. 9 is an image of a resulting reconstructed scene using point cloud matching of a conventional method;

FIG. 10 is an image of a resulting reconstructed scene using point cloud matching of a conventional method FIG. 11 is an image of a resulting reconstructed scene using the method of point cloud registration for image processing in accordance with at least one of the implementations disclosed herein;

DETAILED DESCRIPTION

Figure 1A:
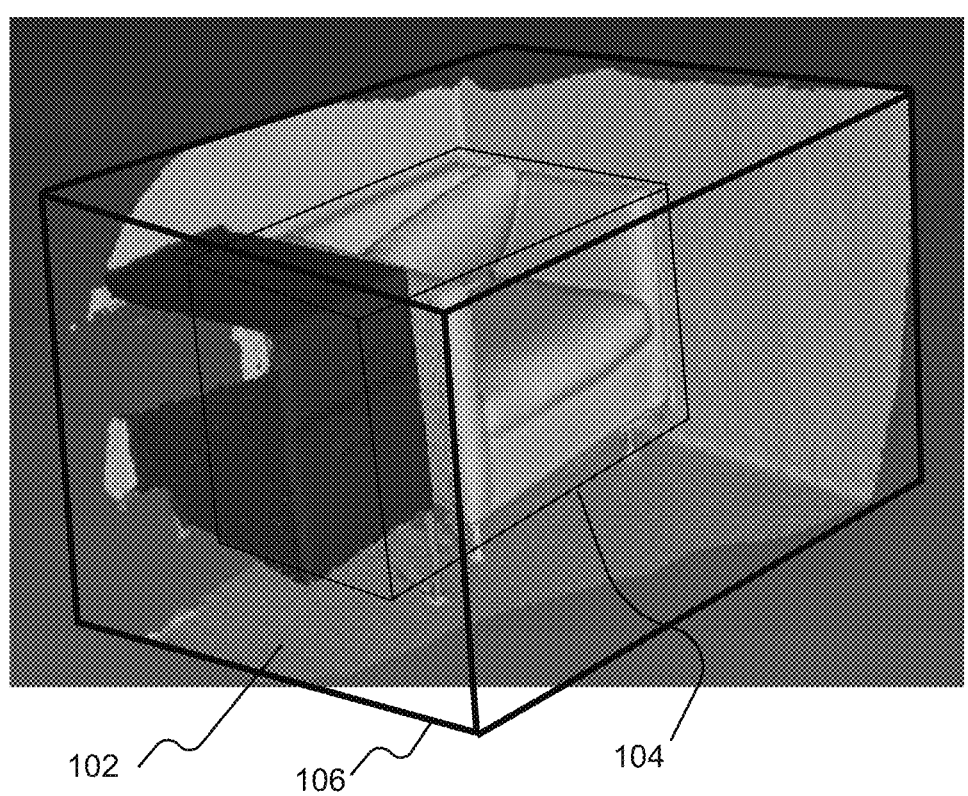
FIGS. 1A and 1B is a pair of pictures of a scene with objects formed by point clouds and taken from a moving camera.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with single or multiple cameras, wearables such as HMDs, robots, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide point cloud registration for image processing.

As mentioned above, point cloud registration may be used to match the same point on an object in multiple captured images either from multiple cameras in a camera array or a single camera being moved about the scene being captured. The point cloud registration then may be used for rectification for example. The rectification is performed to transform the images from multiple cameras (or multiple images from a single camera), and therefore multiple angles, into a common plane to simplify the feature matching process. The result is that the multiple images are now each viewed from the same perspective or angle so that the images can be placed in the same common plane, the points in the images are much more easily matched by parallel matching lines. Whether or not rectified depending on the application being used, the captured images then may be used for 3D reconstruction to form a 3D depth map, model, or other 3D space, or for other specific 3D reconstruction algorithms such as simultaneous localization and mapping (SLAM) to name one example. The captured images also may be used for object recognition to identify, recognize, and/or measure objects in the 3D space, and so forth for many different applications such as artificial intelligence (AI), robotics and computer vision such as with autonomous vehicles and residential service robots, and point of view (POV) systems such as with virtual, augmented, and mixed reality HMDs, to name a few examples.

The task of point cloud registration is to calculate a transformation matrix by minimizing an alignment error between two point clouds. The iterative closest point (ICP) is the most popular technique on point cloud registration, see P. J. Best et al., "A method for registration of 3-D shapes," IEEE Trans. Pattern Anal. Mach. Intell., vol. 14, no. 2, pp. 239-25 (February 1992). This conventional method iteratively conducts a two-step process: a point-to-point correspondence across the point clouds, and a minimization of a least square distance metric describing the misalignment. It assumes that the Euclidean nearest point pair finds the correct correspondence in most cases. To satisfy this assumption, a common method is to limit the magnitude of sensor changes, for instance to move the camera slowly during visual mapping so there is only a small distance of motion from one image to the next image for the same point. However, this limitation is often violated in real scenarios. For example, when a user is holding the camera while video recording a scene, the user often simply cannot hold the camera sufficiently still for such image processing due to human physical limitations. This may be especially true when a user is attempting to record moving objects and is intentionally moving the camera to attempt to match the motion of the objects, often moving the camera too quickly for accurate 3D processing.

The known improvements of classic ICP can be classified into two categories as follows. First, some solutions select a subset of feature pairs to remove incorrect matching. One technique uses a normal vector to obtain more accurate point pairs. See J. Serafin et al., "NICP: Dense normal based point cloud registration", IROS, pp. 742-749 (2015). Also, a robust point matching (RPM) algorithm was proposed to use soft assignment (softassign) instead of binary assignment for better point selection and matching. See Gold et al., "New algorithms for 2D and 3D point matching: Pose estimation and correspondence", Advances in Neural Information Processing Systems, pp. 957-964 (1995). Other recent methods related to feature pairs combined two strategies to remove matching errors: pre-filtering and overlap filtering. See S. Nobili et al., "Overlap-based ICP Tuning for Robust Localization of a humanoid Robot", ICRA (2017). In each filtering technique, a set of error matches are removed. Some techniques attached descriptors to the points to eliminate ambiguities, such as with signature of histograms of orientations (SHOT). See Serafin et al.; Y. Zhuo et al., "Automatic registration of partial overlap three-dimensional surfaces", Mechanic Automation and Control Engineering, proc. Of the International Conf. on. Pp. 299-302 (2010); Nobili et al.; and Tombari et al., "Unique signatures of histograms for local surface description", European conference on computer vision, Springer, Berlin, Heidelberg, pp: 356-369 (2010). The main drawback of all of these methods is that they still are easily affected by noise, large viewpoint changes, and occlusions. In addition, many of the complex descriptors mentioned above are time consuming.

Second, the other solution to improve ICP is to use various error metrics to improve robustness. Some techniques used multiple error metrics such as point-to-plane and plane-to-plane matching See respectively, Grant et al., "Point-to-plane registration of terrestrial laser scans J. ISPRS Journal of Photogrammetry and Remote Sensing", 72: 16-26 (2012); and A. Segal et al., "Generalized-ICP", in Proceedings of Robotics: Science and Systems (RSS) (2009). Another example, Iteratively Reweighted Least Squares (IRLS)" was proposed using various cost functions to provide robustness to noise. See P. Bergstrom et al., "Robust registration of point sets using iteratively reweighted least squares", Computational Optimization and Applications, 58(3): 543-561 (2014). Another technique introduced a trimmed ICP algorithm, which extended the application of ICP to point clouds with partial overlap, See D. Chetverikov et al., "Robust Euclidean alignment of 3D point sets: the trimmed iterative closest point algorithm", Image and Vision Computing, 23(3): 299-309 (2005). These methods are robust for a small portion of matching errors to some extent. However, these techniques still cannot handle very small overlapped images of a scene or large rotation from image to image of a scene, e.g., when the overlap ratio (between two images) is lower than 50%, or the rotation between two images is larger than 60°, these techniques still result in inadequate point cloud matching, in turn resulting in many inaccuracies and errors.

The disadvantages of those previous solutions can be grouped into three main aspects. First, those techniques that use low level feature representations are often very noisy in real applications. For example, a conventional point detector used in these techniques are often very sensitive to various factors, including lighting, viewpoints, occlusions, and so on, resulting in many erroneous point matches. Second, the conventional low level feature matching typically is performed in a dense matching space, and is conducted for every iteration in ICP. For instance, in the classic ICP (see Best et al., cited above), the points in the source and target are set to correspond in every iteration, which is the main reason why ICP is slow. This may include brute matching where every point in one point cloud is compared to every, or numerous, points in the other point cloud. This is very time consuming, such that the point cloud registration may cause noticeable delays in other processes, and may consume an unwarranted percentage of a processor's processing capacity. This alone is detrimental to the functioning of the computer, computing device, or camera performing the cloud point registration. Third, an error metric of the point cloud registration may be based on local descriptors which also are sensitive to large rotations and small overlaps. Thus, although some improvements have been proposed, these improvements do not work well with very large rotation or very small overlap from image to image, e.g., where the overlap ratio is lower than about 50%. The point registration becomes mostly unusable when overlap between point clouds is smaller than 40% or the rotation angle is larger than 60°. For the inadequate improvements, see Grant et al., Bergstrom et al., and Chetverikov et al. cited above.

To resolve these issues, an efficient and accurate method and system of point cloud registration for image processing may include an iteratively modifying the position or dimensions or both of three-dimensional overlap regions that enclose some part of point clouds forming a scene in two images. The iterations may be used to modify the position and dimensions of the overlap regions until a convergence is reached. During the iterations, the overlap regions also are adjusted to align to principal axes detected in the point clouds of the two images. The best overlap regions respectively of the two images so far may be used as the initial overlap regions in the next iteration. The transformation including a rotation part (such as a rotation matrix) and a translation part (such as a translation vector) then may be established by using the overlap regions formed during the convergence iteration. This avoids the heavier necessity of storing and modifying data such as weights for many points from iteration to iteration, thereby reducing the memory capacity, processing time, and power capacity functions of the computing device.

Now in more detail, given two point clouds P and Q, the task of registration is to estimate the rotation matrix R and the translation vector T from P to Q. To accomplish this, an overlap region B may be used, and here shaped as a cuboid, with B=(x, y, z, w, h, l) where the variables (x, y, z) is the center point coordinate of the overlap region, and (w, h, l) are the width, height, and length dimensions of the overlap region. For simplicity, the dimensions may be set at w=h=l. Overlap regions $B^P$ and $B^Q$ are denoted as the overlap in P and Q respectively. The joint estimation of the transformation and the overlap regions is formulated to maximize their joint posterior probability:

$$\hat{R}, \hat{T}, \hat{B}^P, \hat{B}^Q = \underset{R,T,B^P,B^Q}{\operatorname{argmax}} p(R, T, B^P, B^Q | Z), \quad (1)$$

where Z( ) is the observations and that Z=[Z(P),Z(Q)]. This may be rewritten as:

$$p(R,T,B^P,B^Q|Z)=p(B^P,B^Q|Z)\cdot p(R,T|B^P,B^Q), \quad (2)$$

where the first probability on the right side of the equals represents the posterior probability of the overlap, while the second probability stands for the conditional probability of the transformation when their overlap is known. It is assumed that the prior probability distribution of the overlap $p(B^P, B^Q)$, and the prior probability distribution of observation $p(Z)$ are both uniform. According to the Bayes theory, the above equation (2) can be rewritten as:

$$p(R, T, B^P, B^Q | Z) = \quad (3)$$
$$\frac{p(Z | B^P, B^Q) * p(B^P, B^Q)}{p(Z)} \propto p(Z | B^P, B^Q) \cdot p(R, T | B^P, B^Q)$$

Therefore, the estimation of R, T, $B^P$, $B^Q$ is divided into two sub problems: (1) the problem of overlap $B^P$ and $B^Q$ estimation by maximizing $p(Z|B^P, B^Q)$, and (2) the problem of transformation R and T estimation given $B^P$ and $B^Q$ by maximizing $p(R,T|B^P, B^Q)$. These two sub problems are interconnected and may be solved in an iterative process where the conditional probability of the observation may be represented by matching principal axes of the point clouds to the overlap regions, while the posterior probability of the transformation may be represented by the selection of the best overlap region (and its matched principal axes) for an iteration. Performing the disclosed method then effectively performs the probability equation (3) above. The details are explained below.

To accomplish these tasks, first, a Manhattan world assumption is used. The Manhattan world assumption is an assumption about the scene statistics of city and indoor scenes. See Flint et al., "A dynamic programming approach to reconstructing building interiors", ECCV (2010). The assumption is that such city or indoor room scenes were built on a Cartesian grid in which surfaces in the world are aligned with one of three dominant directions where all planes are either parallel or perpendicular to each other. It is based on the observation that most indoor and city scenes are designed on a Manhattan three-dimensional grid. The disclosed method makes use of the geometric priors in Manhattan scenes in order to define a principal coordinate system (or axes) for the point clouds, and introduces a registration method based on the principal coordinate axes and registration of the three-dimensional overlap regions, here cuboids, that represent the two point clouds to be registered to each other.

Based on the representation, the overlap regions can be estimated with great precision, which accurately removes irrelevant points, leading to robustness of point cloud registration of multiple images with small overlaps of the same scene. To accomplish this, principal coordinate axes are aligned during a transformation estimation. This is performed very fast due to the ability to effectively use a small search space that does not rely on traditional low level feature matching, and which also leads to robustness towards large rotations from image to image.

The disclosed method and system achieves a significantly better result than the state-of-the-art in terms of both effectiveness and efficiency. When the overlap between point clouds is smaller than about 40% or the rotation angle is larger than about 60°, the disclosed method significantly outperforms the state-of-the-art methods. This is especially true when the overlap ratio is less than about 30%, or the rotation angle is larger than about 90°. Such increase in accuracy and reduction in computational load, improves the functioning of the computer, computing device, or camera by reducing power and processor time consumed by performing these tasks leaving the computing device with more power and time to perform other tasks. Other details are provided below.

Referring now to FIG. 1A, each image 100 providing a point cloud 102 to be registered to each other may have the point cloud limited with a bounding box 106. The bounding box 106 may be unique for each point cloud and may be computed automatically by finding the minimum and maximum coordinate of the points on each default axis (x, y, z) for example. BY one form, the bounding box is the smallest possible bounding box to enclose the point set of a point cloud.

Figure 1B:
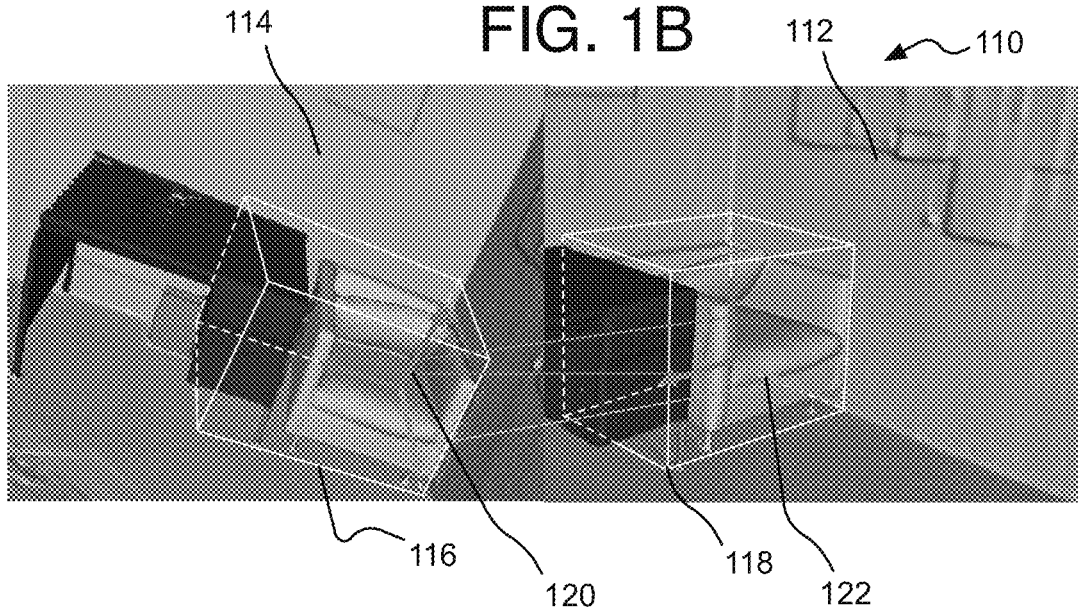

As mentioned, the main unit that is being manipulated by the methods here is an overlap region 104. The overlap region is placed within the point cloud 102 of the image 100, and in turn the bounding box, at a location likely to overlap two point clouds of two images being compared. The overlap region then may enclose at least some of the points within the point cloud. Thus, the bounding box is larger than the overlap region, Referring to FIG. 1B, an example scene 110 shown in two images 112 and 114 is shown from two different perspectives whether captured from a single camera that is moved from image to image or captured from multiple cameras each providing one of the images 112 or 114. As shown, each image 112 and 114 has its own overlap region 118 and 116 respectively. By one form, the overlap region is cuboid, and more particularly cubic where the edge length is the same in all three directions (width, height, and length of the overlap region). It will be appreciated, however, that the methods herein could be applied to overlap regions with other shapes than cuboid or cubic. Also, and as described below, the methods herein modify the position and edge length of the overlap regions. Herein the position refers to the center point of the overlap region and the edge length is the edge forming a corner of the overlap region where two planes of the overlap region meet. It will be understood, however, that other alternatives could be used such as a corner or other desired location in or on the overlap region to be used as the position discussed herein, and the edge length (also referred to herein as edge size) may be referred to as edge dimension as well, but could be replaced with any overlap dimension that conveniently and accurately indicates a size of the overlap region for the purposes explained herein.

As mentioned, the point cloud registration may be achieved by a principal axes alignment within or on the overlap region. Such principal axes alignment is represented by a principal axes pair having two detected principal axes 120 and 122 that are detected by using the points in the point clouds. Herein, the principal axes refers to a Cartesian coordinate system with three axes (x, y, z), and the principal axes may be referred to herein as a principal coordinate system or principal axes system. Thus, the term "principal axes pair" or "candidate principal axes pair" discussed below refers to two matched principal axes each with three axes (x, y, z) and where the x-axis of one principal axes in the pair is matched to the x-axis of the other principal axes of the pair, and so on for each of the three axes. The principal axes 120 and 122 here are shown aligned to each other as well as respectively aligned to the overlap regions 116 and 118. The details of such alignment is provided below.

Referring to FIG. 2, a disclosed method 200 provides an overview for a method and system of point cloud registration for image processing. In the illustrated implementation, process 200 may include one or more operations, functions or actions 202 to 210 numbered evenly. By way of non-limiting example, process 200 may be described herein with reference to example image capture processing system 1200 of FIG. 12, and where relevant.

Process 200 may first include first obtaining a pair 202 of two captured images 212 and 214 each with a point cloud to be registered to each other. This may be an automatic process where point clouds are registered to each other every two frames of a video sequence or could be some other interval whether registered one or more times per video sequence as desired, and may be decided differently depending on the application. For instance, in a SLAM 3D model application, usually every two adjacent frames are registered, but for other 3D scene reconstruction applications, the images may be registered less frequently. By one form, the process is applied every other frame for 3D object reconstruction if the camera moves slowly. Also, the point clouds may be registered once every continuous scene or depending on some other content related indicator. Otherwise, the point clouds may be registered from two images once or other desired number of times upon a user selecting a certain mode on a computing device or camera, such as a 3D-related mode, or when setting a desired quality level or other computer function level (such as battery, processing speed, or memory capacity related settings). It also will be appreciated that the images may be single shot or still camera images as well.

Thereafter, a principal axes extraction operation 204 includes the extraction of three dominant orthogonal directions, and name them as the principal axes. This is performed by detecting planes 216 using the Manhattan world assumption so that all resulting planes are parallel or perpendicular. The normals 218 of the planes are used to pair perpendicular planes to construct a principal axes with each pairing of perpendicular planes.

Once an initial overlap between point clouds is determined as represented by initial overlap regions (such as overlap regions 116 and 118 in FIG. 1B), an iterative process may be used to determine refined or best overlap regions that can be used to establish a final transformation. The details for selecting the initial overlap regions is provided below. The iterative process may include an estimation of transformation 210 that is achieved by using aligned principal axes 222 and 224 of the two overlap regions representing the two point clouds being registered, and shown here formed during a principal axes alignment operation 208. The estimation of the transformation 210 represents the posterior probability described above. Also, an estimation of the overlap may be used when the overlap still is considered to be unknown or too coarse, and may be referred to as an overlap tuning operation 206, which represents the conditional probability of the observation described above, and is used to determine a best overlap region 226. The estimation of the overlap and the transformation is a coupled question, and an integrated framework is proposed to jointly optimize them.

Referring to FIG. 3, a process 300 is provided for a method and system of point cloud registration for image processing. In the illustrated implementation, process 300 may include one or more operations, functions or actions 302 to 308 numbered evenly. By way of non-limiting example, process 300 may be described herein with reference to example image capture processing system 1200 of FIG. 12, and where relevant.

Process 300 may include "obtaining image data of multiple images of the same scene from one or more cameras and including a first image and a second image each respectively being associated with a first point cloud and a second point cloud both separately forming the scene" 302. As mentioned above, such pairing of images with point clouds to be registered may be performed once per video sequence or continuous scene, every two images, or any other desired time interval.

Then, the process 300 also may include "generating three-dimensional first and second overlap regions each respectively enclosing points from, and having a position and dimensions in, the respective first and second point cloud" 304. This may include generating initial first and second overlap regions each with a center point, or other position indicator, located at a certain point relative to its point cloud. This also may include setting an edge length(s) of the two point clouds. By one form, the center points of both overlap regions starts at the center point of the bounding box of the point clouds, and the edge length is some factor of the size of the bounding box.

Separately, the process may include forming a set of candidate principal axes pairs comprising determining at least one principal axes formed by using the first point cloud to be paired with a principal axes formed by using the second point cloud and to generate candidate principal axes pairs. As mentioned, this may be accomplished by first using a Manhattan world assumption to detect planes used to form the principal axes. The principal axes may be formed from two normals respectively of detected perpendicular planes and computing the third axis by using the two normals to form three axes for each principal axes. The pairing of two principal axes may be performed by comparing color or luminance image data histograms along each axis of the principal axes being considered for pairing.

Process 300 then may include "iteratively modifying the position or dimensions or both of the first and second overlap regions to generate best first and second overlap regions so far of each iteration and until a convergence criteria is met" 306. Particularly, this operation may include generating a set of overlap region samples with variations in position or dimensions or both of that of the initial first and second overlap regions that are initial relative to an individual iteration. The overlap region samples are varied from the initial overlap regions by use of Gaussian distribution-based random sampling of variations of the position, dimensions, or both of the initial first or second overlap region.

A best principal axes pair of the set of candidate principal axes pairs then may be iteratively matched to individual overlap region samples, and this represents the posterior probability mentioned above. Determining the best match may comprise differencing an individual overlap region sample varied from the first or second overlap region, and differenced from the other of the initial first or second overlap region maintained with an initial center point position but where an edge length is varied to match the edge length of the overlap region sample being compared to. Before the differencing is performed, the overlap region sample may be adjusted to align with the principal axes of one of the candidate principal axes pair, and the other initial overlap region (with its center point fixed and edge length equal to the edge length of the overlap region sample) may be adjusted to align with the other principal axes of the one candidate principal axes pair. By one form, the differencing comprises determining a hamming difference between binary histograms point distributions within the adjusted overlap region sample and the initial overlap region. The candidate principal axes pair causing the smallest hamming distance associated with an overlap region sample, among all of the candidate principal axes pairs, may be considered a match to the overlap region sample. The hamming distance herein refers to a difference in bin values of the same bin location. Thus, if the overlap regions have bins 1 to 5, where one overlap region has values [1 0 0 1 0] and another overlap region has bin values [0 1 0 10}, then the absolute value result is (1−0)+(0−1)+(0−0)+(1−1)+(0−0)=2.

Also at each iteration, the best overlap region sample and matched best principal axes pair among all of the overlap region samples may depend on a difference in point distribution of (1) the overlap region sample of one of the first and second point clouds and (2) an overlap region of the other of the first and second point clouds, and this represents the conditional probability mentioned above. By one form, the hamming distances are already computed for the previous operation and may be compared to each other to determine which overlap region sample is associated with the minimum hamming distance, and is therefore, the best overlap region sample of the iteration. An updating test may be performed to determine if the best overlap region samples are better than the ones resulting from the prior iterations. If not, the iterations are continued by using the best overlap regions of the current iteration as the initial overlap regions of the next iteration. If at least one of the two best overlap region samples is better than the prior overlap region samples, then a convergence operation is performed. Convergence occurs when a difference in position or dimensions or both of the best overlap regions from one iteration to another meets a convergence criteria, such as a threshold. Once convergence is reached, iterations are stopped and the last best overlap region samples are used to establish a transformation.

The process 300 may include "establishing a transformation at least partially based on the best overlap regions, and the transformation comprising a rotation part, a translation part, or both to convert point locations between the first and second point clouds" 308. Thereby establishing a transformation that can be used to convert point locations of one of the point clouds into point locations on the other point cloud. This point cloud registration then can be used to generate a 3D map, 3D model, and forth as mentioned above.

Figure 4:
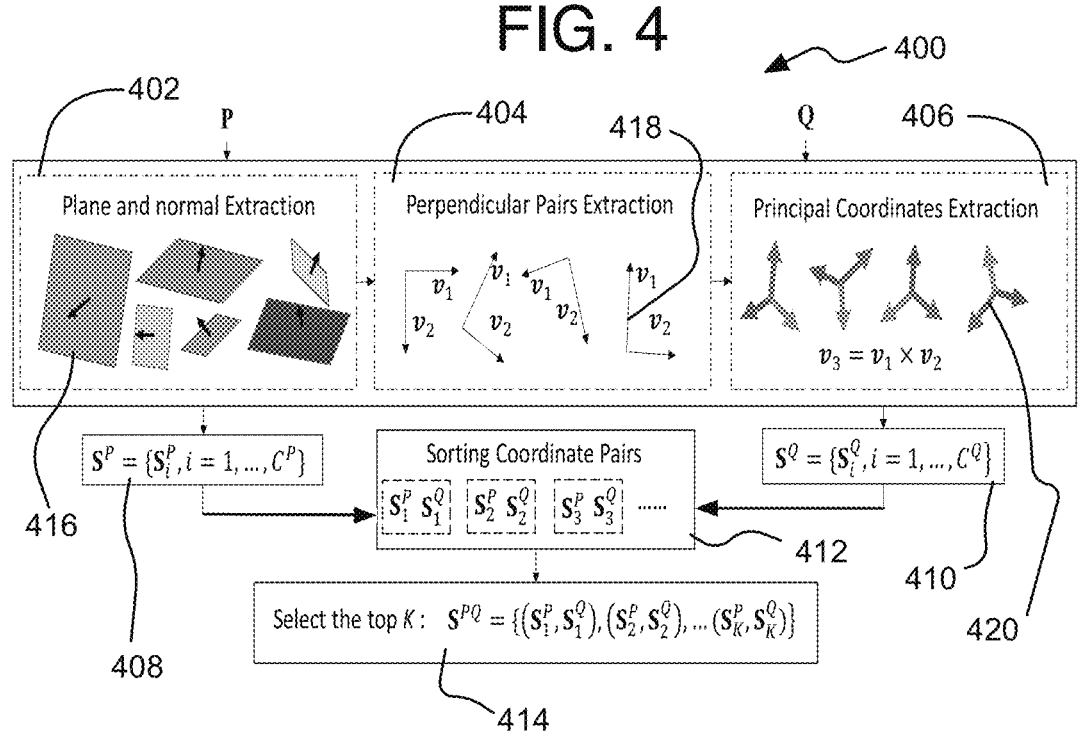
FIG. 4 is a flow diagram of a method of principal axis extraction in accordance with at least one of the implementations disclosed herein.

Referring to FIG. 4, a process 400 is provided for generating a set of candidate principal axes pairs to be used to explain operations of the detailed process 500 described below. In the illustrated implementation, process 400 may include one or more operations, functions or actions 402 to 414 numbered evenly. By way of non-limiting example, process 400 may be described herein with reference to example image capture processing system 1200 of FIG. 12, and where relevant.

Process 400 may include plane 416 and normal extraction 402 from two point clouds to be registered to each other.

Perpendicular planes are used to form 404 axes pairs 418, and principal coordinates 420 are extracted 406. These three operations are performed for each point cloud. The principal axes 420 from each point cloud are then matched or sorted 412 to form candidate principal axes pairs. By one form, all possible pairs are maintained as candidates for the iterations. By another form, only some number of the principal axes pairs with the least difference between the paired principal axes (the top K candidate principal axes) are used for the iterations.

Figure 5H:
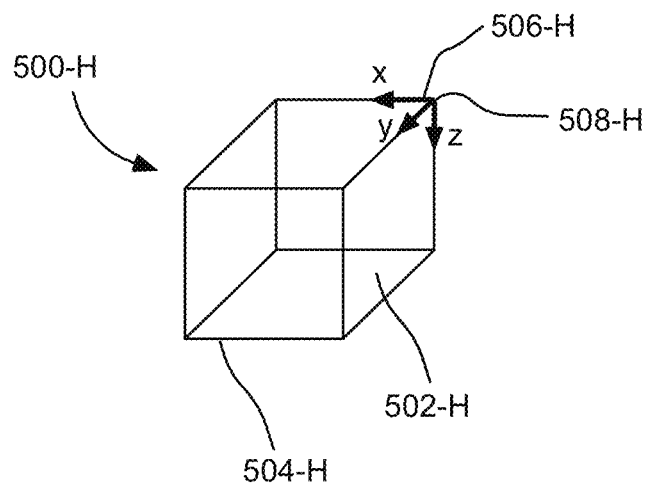
FIG. 5H is a schematic diagram to explain principal axes alternatives on a cuboid overlap region in accordance with at least one of the implementations disclosed herein.
Figure 5E:
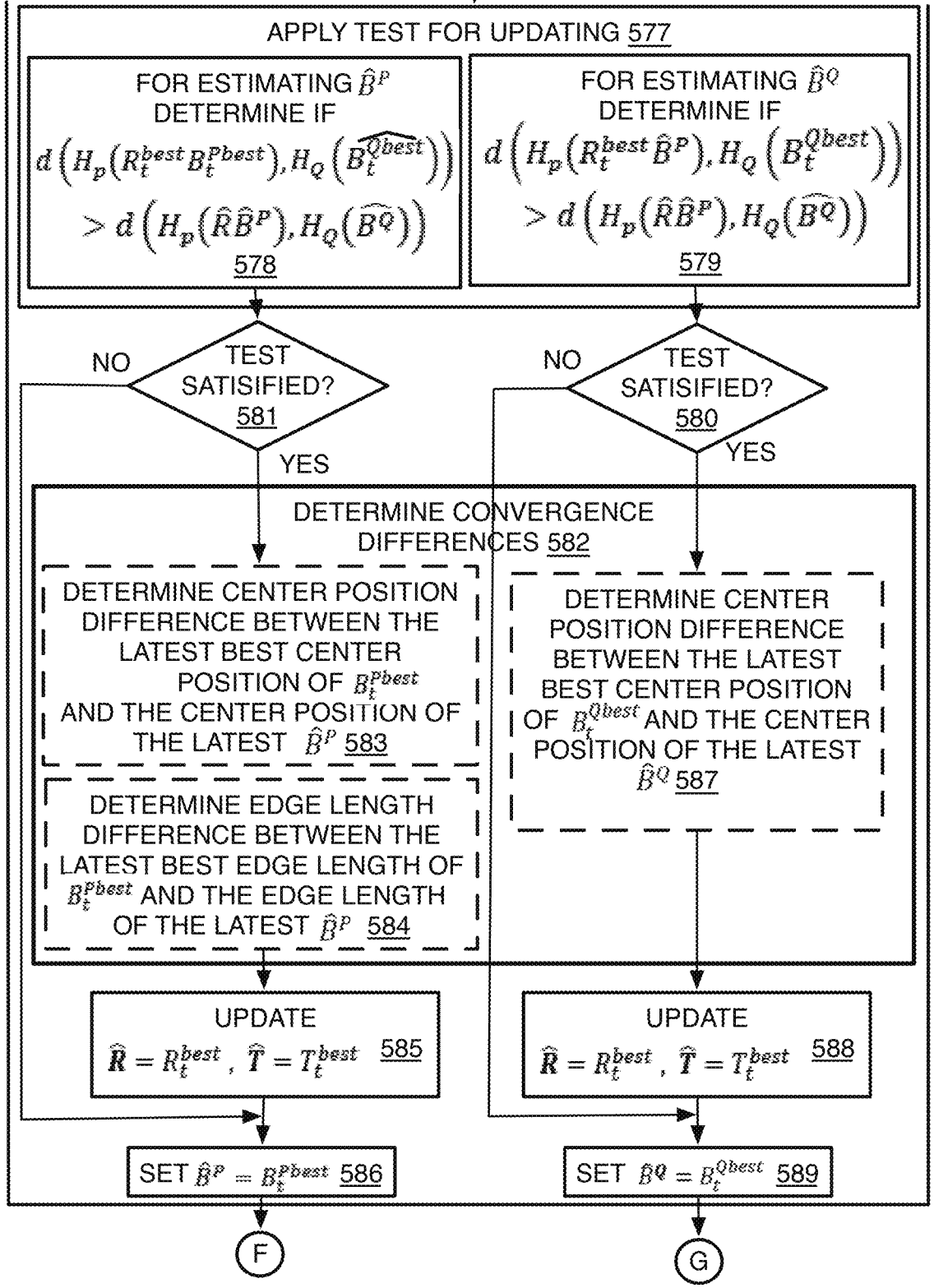

Referring to FIG. 5, process 500 is provided for a method and system of point cloud registration for image processing. In the illustrated implementation, process 500 may include one or more operations, functions or actions 502 to 550 numbered evenly. By way of non-limiting example, process 500 may be described herein with reference to example image capture processing system 900 of FIG. 9, and where relevant.

Process 500 may include "determine if Manhattan space is to be processed" 501. By one form, the user may have the process initiated only when the scene to be captured and used for point cloud registration has a structure suitable for a Manhattan world assumption such as with an indoor room or city scene with many parallel and/or perpendicular planes. An indoor room with four walls, a floor, a ceiling, and many tables or counter tops is one example. This also may be performed automatically by a computing device such as detecting the computing device is indoors due to GPS, lighting, or other sensed characteristic of the environment to automatically initiate the process.

Process 500 may include "obtain image data of multiple images of the same scene" 502, and this may include obtaining images as frames of a video sequence or a series of still photographs. The scene being captured may be a stationary scene or may have moving objects, and the camera may be held still or may be moving as well. With the present process 500, better quality and better functionality of the computing device can be achieved despite a relatively low overlap and/or large difference in viewing angle from image to image as described below.

Process 500 may include "perform pre-processing" 504, and pre-processing at least sufficient to perform the point cloud registration when raw image data is received from one or more camera sensors for example. Such pre-processing may include noise reduction, pixel linearization, shading compensation, resolution reduction, Bayer demosaic, vignette elimination, and/or 3A related operations including automatic white balance (AWB), automatic focus (AF), and/or automatic exposure (AE), and so forth.

Process 500 may include "obtain image pair both with points of the same scene to be matched to each other" 506. The process 500 may be performed on two point clouds. Thus, the process 500 may be applied on just two RGBD images for example, but could also be applied on every two images in a video sequence as already described above. This can be an option provided to a user or switched on or off automatically also as described above.

Process 500 may include "generate a point cloud for each image of the pair within a bounding box" 508. Particularly, many different algorithms for point cloud generation exist, and are often based on some feature detection where edges or boundaries of objects are detected by algorithms that use gradients of color and/or luminance in the image data. Point cloud generation techniques used here for RGBD images may simply convert coordinates to 3D points for the point cloud and may follow $(X, Y)=((x-cx)*Z/f, (y-cy)*Z/f)$, where $(X, Y, Z)$ is the 3D coordinate in the camera coordinate system, $(x, y)$ is the image coordinate, $(cx, cy, f)$ are the camera intrinsic parameters. See for example, M Langer, "World vs. Camera Coordinates", University of McGill, Center of Intelligent Machines, COMP 558, Lecture 4, www.cim.mcgill.ca/~langer/558/4-cameramodel.pdf (2010); R. Collins, "Lecture 12: Camera Projection Reading: T&V Section 2.4", CSE 486 Computer Vision I, Introduction to Computer Vision, Penn. State, www.cse.psu.edu/~rtc12/CSE486/lecture12.pdf (2007). For an RGB image, depth is estimated first and then the point cloud. For instance, estimate of depth using stereo images is disclosed by K Zhang, et al., "Cross-Scale Cost Aggregation for Stereo Matching[C]//Computer Vision and Pattern Recognition", IEEE, 2014:1590-1597; estimate of depth using video sequence is disclosed by K Karsch et al., "Depth Extraction from Video Using Non-parametric Sampling[C]//", European Conference on Computer Vision, Springer, Berlin, Heidelberg, 2012:775-788, and estimate of depth using a single image is disclosed by D. Eigen et al., "Depth Map Prediction from a Single Image using a Multi-Scale Deep Network[J]", Dept. of Computer Science, Courant Institute, New York University, 2014:2366-2374. The point clouds for registration are designated as P and Q for the remainder of the process 500.

While referring to process 400 (FIG. 4) as well, process 500 may include "extract candidate rotationally-aligned principal axes pairs" 510. This may first involve an operation to "detect planes in both point clouds" 512 (also operation 402 (FIG. 4)). For this operation, first all possible planes may be detected no matter the orientation of the plane. This may be performed using techniques such as Hough transform or random sample consensus (RANSAC) to name a few examples. Then, to "use Manhattan assumption planes" 514, only planes perpendicular to at least one other plane is maintained.

Process 500 may include "form perpendicular axis pairs on crossing planes" 516. Where it is detected that planes are perpendicular, the normals of those two planes are maintained together as the first two of three axes to form a principal axes. The normals here are unit normals of each plane (where length is designated as 1). This is repeated for each perpendicular pair of planes that are detected, as represented by operation 404 (FIG. 4), where axis $v_1$ is paired with perpendicular axis $v_2$ for each pair.

Process 500 may include "form third axis for each axis pair" 518, and specifically to form a principal axes (or principal coordinate system) S. The principal axes may comprise three orthogonal axes selected from the normal vectors of the dominant detected planes. The three principal axis may be denoted as $v_1, v_2, v_3$ where $v_1 \perp v_2, v_1 \perp v_3, v_2 \perp v_3$ which comply with the right hand rule. Thus, the principal axes may be defined as $S=[v_1 v_2 v_3]$ where $v_1, v_2, v_3$ are each 3×1 column vectors so that S is a 3×3 matrix. By one form, the three values that form each axis (or vector v) are values that indicate the direction of the normal that forms that axis, or in other words, each axis is a normal vector [a, b, c] from the equation of a plane $(ax+by+cz+d=0)$, although other forms could be used.

For each pair of normal vectors (or axes), if they are perpendicular to each other, they are selected as candidates for $v_1$ and $v_2$ as mentioned above, while the third principal axis is obtained by:

$$v_3 = v_1 \times v_2 \qquad (4)$$

where "x" is the cross product of the two vectors. This operation is also shown on process 400 (see operation 406, FIG. 4). The generation of the principal axes for the two point clouds P and Q also may be referred to as $S^P=\{S_i^P, i=1$ to $C^P\}$ and $S^Q=\{S_i^Q, i=1$ to $C^Q\}$ respectively shown at operations 408 and 410 of process (FIG. 4).

Process 500 may include "select top K axes candidate pairs" 520. A point cloud may have many different principal axes. Thus, the process 500 may generate all or many individual candidate principal axes for P and Q. In order to determine the best overlap regions during the iterations, a principal axes form one point cloud is matched to a principal axes from the other point cloud to form a candidate principal axes pair. This is performed to eventually generate an aligned principal axes (or aligned coordinate system).

If $(\hat{S}^P, \hat{S}^Q)$ is the aligned principal axes for P and Q, the corresponding points in P and Q will only have translation relations in the created coordinate system. In other words, each principal axes establishes its own coordinate system, such as (x, y, z) coordinates in 3D space. Therefore, when the coordinates of points in P and Q are converted to new coordinate systems as indicated by aligned principal axes pair $(\hat{S}^P, \hat{S}^Q)$ and where $P'=\hat{S}^P \times P$ and $Q'=\hat{S}^Q \times Q$ (where "x" here is matrix multiplication), the corresponding points in P' and Q' only have a difference in translation between corresponding points but no difference in rotation, thereby simplifying the determination of the transformation.

Thus, process 500 may include "perform axes matching" 522, and the principal axes of one point cloud may be matched to another principal axes of the other point cloud to form the set of candidate principal axes pairs to be used during the iteration and to determine the aligned principal axes pair and best overlap regions. The matching of principal axes may be performed by using a set of heuristic rules. By one form, process 500 optionally may include "use color histograms" 524. By this option, the image data of the axes are projected into color histograms on each axis, and the principal axes being compared and that have the least difference are designated as candidate principal axes pairs. Other methods rather than the color histograms may be used for matching the principal axes as well. The principal axes matching is shown as operation 412 of process 400 (FIG. 4).

In this example, there may be a threshold cutoff number of candidate principal axes pairs that will be used for the analysis. The selected candidate set may be denoted as $S^{PQ}=\{(S_1^P, S_1^Q), (S_2^P, S_2^Q), \ldots (S_K^P, S_K^Q)\}$ for k=1 to K candidate principal axes pairs, and this is also shown as operation 414 of process 400 (FIG. 4). By one example as shown on FIG. 5H, since there are six faces (such as 502-H and 504-H) in a cuboid overlap region 500-H, there are at most 24 candidates, and therefore 24 possible different orientations, for the principal axes in a cuboid including one principal axes 506-H at each corner 508-H, where one axis (such as the x-axis) may extend in any of three different directions (thus, 8 corners×3 directions for the axes=24). Therefore, the maximum value of K here is 24. Note it does not matter where the candidate axes is located on or in the point cloud or overlap region; the placement of the principal axes at a corner of the cuboid overlap region still may represent the same principal axes extending in the same directions.

By another approach, the process 500 may use all or many individual candidate principal axes pairs rather than limiting the set to only the top K, although such a process may unnecessarily increase the computational load of the point cloud registration.

The process 500 then turns to the iterations. Each iteration has two stages. Generally, the first stage is to estimate (or re-estimate) the overlap region $B^P$. In the first stage, overlap regions $B^Q$ and $B^P$ are initialized (and the initial overlap regions of each iteration are denoted below as $\hat{B}^P$ and $\hat{B}^Q$). $B^Q$ is fixed in the point cloud Q such that its center point position does not change during the first stage. N overlap region samples are generated to represent the candidate overlap regions $B^P$ in point cloud P are then generated as variations in position or edge length or both of the initial overlap region $B^P$. The edge length of $B^Q$ is changed to match the edge length of each overlap region sample it is to be compared to throughout the first stage and still in a single iteration. The best overlap region $B^P$ is then determined during the first stage by finding the maximum observation probability as described below.

In the second stage, the best overlap region $B^P$ from point cloud P and determined in the first stage now has its center point fixed in point cloud P, and then N overlap region samples are drawn to represent the candidate overlap region $B^Q$ in point cloud Q. The overlap region $B^P$ and The iteration proceeds to select the best overlap region $B^Q$ by finding the maximum observation probability as with the first stage. These two stages include both estimation of transformation and overlap tuning processes that are interactively conducted until the overlap region does not change (convergence is reached). When no convergence is reached, the best overlap regions $B^P$ and $B^Q$ in both stages of the iteration are used as the initial overlap regions $\hat{B}^P$ and $\hat{B}^Q$ in the next iteration.

Now in more detail, process 500 may include "obtain initial selected first and second overlap regions" 526. This preliminary operation refers to obtaining any parameters set manually by a user or automatically by the point cloud registration or 3D unit, or any other application. By one example, this may include setting the desired edge length, as some fraction of the length of the bounding box of a point cloud for example. If the user, or a program automatically, wants to use the method in a video sequence, different decimal numbers may be input such as "0.2", "0.3", and "0.5" as fractions of the bounding box length to be set as the edge length of the overlap regions. The best quality or efficient result then may be selected. Otherwise, the input may be a setting such as the decimal number "0.5", which does not ensure the best result, but still provides acceptable results. Many other parameters may be set this way as well.

Process 500 may include "initialize first and second overlapping regions $B^P$, $B^Q$" 528. This may include setting both the position (here, the center point) and the edge length (and in turn, the edge location) of the overlap regions. Thus, process 500 may include "determine center points of first and second 3D overlapping regions" 530. By one form, the overlap regions $\hat{B}^P$ and $\hat{B}^Q$ are initialized to have their center points located at the center of point clouds P and Q respectively, which refers to the center coordinates of the three-dimensional bounding box of P and Q.

Process 500 also may include "determine initial length and location of edges of the first and second overlapping regions" 532. When the overlap region is cubic as in the example provided here, only one number is needed as the input for all three dimensions (width, height and length of the overlap region), and it will be understood that the center point of the three-dimensional cubic overlap region has coordinates one-half edge length from the edge of the overlap region and to each edge in any elevational view of the overlap region. As mentioned, the initial length of the edge of the overlap region may be set by a user or automatically set by a 3D unit or some other application. By one example, the bounding box for the point clouds P and Q are obtained. Then, the longest edge (denoted as 'a') of the two bounding boxes is determined. The initial edge length of the overlap region then may be set at a/2, so an example input may be a decimal number "0.5". The user or application may set the initial edge length according to experimentation or prior knowledge of the point clouds. If no prior information is known, the initial decimal number may be set to some default such as "0.5". A good initial edge length can speed up the process and also helps to improve the registration accuracy, but the number does not significantly affect the final result due to the updating in each iteration that occurs no matter the input edge length.

Process 500 may include an iteration counter that sets the time or iteration as "set t=0" 534 to start on a first iteration. Then, process 500 may include "re-estimate first overlapping region $\hat{B}^P$" 536 to begin the first stage of the iteration. The first stage is considered to continue until operation 589 in the present example. In the first stage, overlap region samples are generated with modified positions, dimensions or both to be used to determine a best overlap region by performing a transformation estimation and overlap tuning as introduced above and explained in greater detail below. The generation of the overlap regions samples may be explained as follows.

The process 500 may include "generate N overlap region samples for n=0 to N samples as variations of $\hat{B}^P$" 538. By one form, N=50 for n=0 to 49 samples, but N may be set to other numbers as desired. This operation of process 500 may include "generate individual samples $B_t^{Pn}$ with variations of edge dimensions, center point position, or both relative to $\hat{B}^P$" 540. By the present example, each overlap region sample has both a change in position and a change in edge length. It will be understood, however, that other examples are possible such as changing the edge length for 25 samples (or some other number) and changing the center position for 25 samples (or some other number. Another option may include having samples generated with edge length changes on some iterations, such as odd iterations t=1, 3, 5, . . . , for example, while samples are generated with center position changes at even iteration t=2, 4, 6, . . . , for example. Many other variations are contemplated.

Process 500 may include "generate the samples $B_t^{Pn}$ using a Gaussian distributed-based random sampling algorithm" 542. Thus, the overlap region samples may be generated completely randomly or at some interval as a ratio of the edge length and center position of the bounding box as described above. Instead, a simplified form of sequential importance resampling (SIR) particle filtering is applied, and this involves using a more efficient technique by using a Gaussian function as a likelihood for sampling. The other details of the particle filtering are provided below with explanation of the overlap tuning. Relevant here, a Gaussian function can be applied to obtain the overlap region samples n.

For instance, the position and the size (edge length) are sampled independently. Here, let edge length (or edge size) of an overlap region sample be "s" and the edge length of the initial overlap region $\hat{B}^P$ is $\widehat{s_P}$ as an example, so that to generate one sample is to select an "s" from all possible "s". The Gaussian function or distribution for edge length can then be stated as:

$$N(s, \widehat{s_P}, \sigma_s^2) = \frac{1}{\sqrt{2\pi}\,\sigma_s} \exp\left(-\frac{(s-\widehat{s_P})^2}{2\sigma_s^2}\right) \quad (5)$$

where σ is the deviation (and in turn σ² is the variance) that may be predetermined by experimentation and provided by the 3D unit or other application. In the present implementation, the variance for position may be set to 0.25*edge length, and the variance for edge length may be set to 0.2*edge length although other values may be used.

The Gaussian function indicates which "s" is more likely to be selected by providing a higher value of "s" when "s" is near to $\widehat{s_P}$ and a lower value of "s" when "s" is farther from $\widehat{s_P}$, thereby establishing a Gaussian function or distribution whose mean is the edge length of the best overlap region selected by the previous iteration. The mean of the best overlap region $\hat{B}^P$ is favored because we assume that the $\widehat{s_P}$ and $\widehat{s_Q}$ obtained at the t-th iteration has higher or equal conditional observation probability than that in the (t−1)-th iteration. Many different techniques may be used to implement the Gaussian sampling. See for example, www.alanzucconi.com/2015/09/16/how-to-sample-from-a-gaussian-distribution.

For the change in position (or center point), the position may be represented as a vector c=(x, y, z) which is the center point of the cuboid, its Gaussian function is $$N(c, \widehat{c_P}, \Sigma) = \frac{1}{(2\pi)^{\frac{3}{2}}|\Sigma|^{\frac{1}{2}}} \exp\left(-\frac{1}{2}(c-\widehat{c_P})^T \Sigma^{-1}(c-\widehat{c_P})\right) \quad (6)$$

where $\widehat{c_P}$ is the center point of $\hat{B}^P$, and E is the covariance (identity) matrix:

$$\Sigma = \begin{bmatrix} 1 & 0 & 0 \\ 0 & 1 & 0 \\ 0 & 0 & 1 \end{bmatrix} \quad (7)$$

Still in the first stage, process 500 may include "generate individual samples $\hat{B}^{Qn}$ with variations of edge dimensions with the same edge dimensions as a corresponding $B_t^{Pn}$, and a center point position fixed as the same as $\hat{B}^Q$" 544. Fixed here refers to maintaining the center point of each overlap region $\hat{B}^{Qn}$ to be the same as the initial (or latest) $\hat{B}^Q$. Thus, in the first stage, when overlap region samples $B_t^{Pn}$ are generated, each sample changes in both its center position and edge dimensions. Then, when the n overlap region samples $\hat{B}^{Qn}$ are generated in the first stage, the $\hat{B}^{Qn}$ are generated each with a same edge size as $B_t^{Pn}$ but with a center position that is the same as $\hat{B}^Q$ so that the two overlap regions used as input in equation (X) below in order to align (or match) the principal axes with the overlap regions have the same size. In other words, comparing overlap regions with different sizes, and in turn different sizes in point distributions, is more likely to be less accurate.

In the second stage, operation 540 includes (in the 2nd stage, only modify center points to generate individual samples $B_t^{Qn}$). Specifically, similar operations may be performed except in the second stage where overlap region samples for $B_t^{Qn}$ are generated using the Gaussian distribution. Thus, in the second stage, the center points are modified using equation (6) above except for switching each 'P' with 'Q'. However, the edge length of all of the overlap region samples $B_t^{Qn}$ are fixed to be the same as the edge length of the latest best $\hat{B}^P$, the center point of $B_t^{Qn}$ is otherwise independent of the center point of $\hat{B}^P$. The overlap region samples $B_t^{Qn}$ will be compared to the latest best $\hat{B}^P$ with its edge length and center point unchanged (544).

Returning to the first stage description, the transformation estimation may be performed by using principal axes or principal coordinate alignment. The overlap regions may be set to have cuboid faces that are each parallel to one of the principal axes of the point cloud. Once the center points and edge lengths of the overlap regions $B^P$ and $B^Q$ are set in the point clouds P and Q respectively, the problem of transformation estimation is to select the best transformation rotation part R and translation part T that maximize the probability $p(R,T|B^P,B^Q)$, and which represents the conditional probability of the transformation given their overlap regions as explained above.

Given points in an overlap region B, its observation Z(B) may be described by a binary point distribution histogram $Z(B)=H_p(B)$. The overlap region B is divided into M cubic bins where each bin size may be set to about $0.05^3$ m³ for example in this disclosure, the function $H_p(\ )$ is defined as a binary histogram where the value in each bin $H_p[m]$ (m=1, 2, ... M) is 1 if the number of points in this bin is larger than a threshold and 0 otherwise. The cost of matching two overlap regions $B^P$ and $B^Q$ then may be defined as:

$$\text{cost}(Z(B^P),Z(B^Q))=d(H_p(B^P),H_p(B^Q)) \quad (8)$$

where function d( ) is the Hamming distance. In order to select the aligned coordinate system pair for P and Q, we define a likelihood that measures the coordinate system alignment probability when given the overlap regions:

$$p(S_i^P, S_i^Q \mid B^P, B^Q) = \quad (9)$$
$$\exp^{-\text{cost}(Z(S_k^P \times B^P), Z(S_k^Q \times B^Q))} = \exp^{-d(H_P(S_k^P \times B^P), H_Q(S_k^Q \times B^Q))}$$

and the aligned coordinate system pair may be selected by:

$$(\hat{S}^P, \hat{S}^Q) = \underset{S_k^P, S_k^Q \in S^{PQ}}{\text{argmax}}\ p(S_k^P, S_k^Q \mid B^P, B^Q) = \exp^{-d(H_P(S_k^P \times B^P), H_Q(S_k^Q \times B^Q))} \quad (10)$$

where a principal axes $S_k^P, S_k^Q$ belongs to one of the k=1 to K candidate principal axes pairs $S^{PQ}$. As mentioned, K may be limited to the 24 possible orientations on a cuboid. Due to such a sparse space for principal axes alignment rather than testing every possible principal axes pair in the point clouds, the method can be very fast.

To implement this principal axis alignment equation (or matching of principal axes to overlap region sample), process 500 may include starting a sample counter to "set n=0" 545 to initiate the process. Thereafter, process 500 may include "set $B^P=B_t^{Pn}$" 546, "set $B^Q=\hat{B}^{Qn}$" 548, and "set k=0" 550.

Process 500 then may include "determine adjusted overlap regions for $B_t^{Pn}$ and $\hat{B}^{Qn}$ aligned to principal axes k as $(S_k^P \times B_t^{Pn})$ and $(S_k^Q \times \hat{B}^{Qn})$" 552. This refers to matrix multiplication, and adjusts the coordinates of the points in the overlap region samples $B_t^{Pn}$ and overlap region $\hat{B}^{Qn}$ respectively to the coordinates of the principal axes $S_k^P$ and $S_k^Q$ to thereby align the overlap region samples and the overlap region to the respective principal axes.

Process 500 may include "determine difference between adjusted overlap regions" 554, and by one form this includes an operation to "determine hamming distance d between binary point distribution histograms of each adjusted overlap region" 556, and according to equation (7) above. It will be understood that other equations may be used for determining hamming distance or a different representative difference between the overlap regions aligned to candidate principal axes.

PQ Process 500 may include "save $S_k^{PQ}$ as best for n if hamming distance $\exp^{1/d}$ is a maximum so far" 558, where the candidate principal axes pair is saved as the potential aligned principal axes pair that has the maximum value for alignment equation (7). The first time the alignment equation (7) is used for an iteration, the first value is automatically saved.

Process 500 proceeds with an inquiry "k=K?" 560 to determine if all candidate principal axes have been tested yet, and if not the process 500 may include "set k=k+1" 562, and the process loops back to operation 552 to test the next principal axes pair $S_k^{PQ}$ for alignment and matching to an overlap region sample $B_t^{Pn}$. Once all of the candidate principal axes pairs K are tested, process 500 may include "set last saved $S_k^{PQ}$ as best aligned principal axes pair $(\hat{S}_t^{Pn},\hat{S}_t^{Qn})$ for n" 564 such that a principal axes pair is now aligned (or matched to) an overlap region sample $B_t^{Pn}$.

Process 500 then may include an inquiry "n=N?" 566 to determine if all overlap region samples N have been tested already. If not, process 500 may include "set n=n+1" 567 to obtain the next overlap region sample $B_t^{Pn}$ and its corresponding overlap region $\hat{B}^{Qn}$. This next overlap region sample is then tested with all of the candidate principal axes $S_k^{PQ}$ until all (or some desired amount less than all) of the overlap region samples $B_t^{Pn}$ are matched or aligned to a principal axes pair.

Once the principal axes alignment is complete for each overlap region sample, process 500 proceeds with an overlap tuning operation to determine the single best overlap region for the iteration, and which represents the posterior probability as explained above. The basis for the overlap tuning is as follows.

A recursion of Bayesian filtering may be employed to estimate the overlapped region. In the Bayesian predict stage, the overlap regions in P and Q are predicted, and in the update stage, the overlap regions are updated based on the observation:

$$\text{Predict: } p(B_{t+1}^P, B_{t+1}^Q \mid Z_t) = \quad (11)$$
$$\int \int p(B_{t+1}^P, B_{t+1}^Q \mid B_t^P, B_t^Q) \cdot p(B_t^P, B_t^Q \mid Z_t) dB_t^P dB_t^Q$$

$$\text{Update: } p(B_{t+1}^P, B_{t+1}^Q \mid Z_{t+1}) = \quad (12)$$
$$\frac{p(Z_{t+1} \mid B_{t+1}^P, B_{t+1}^Q) \cdot p(B_{t+1}^P, B_{t+1}^Q \mid Z_t)}{p(Z_{t+1} \mid Z_t)} \propto$$
$$p(Z_{t+1} \mid B_{t+1}^P, B_{t+1}^Q) \cdot p(B_{t+1}^P, B_{t+1}^Q \mid Z_t)$$

where 't' is the iteration time. The above predict and update steps are iteratively conducted until convergence. This iterative process is theoretically appealing, but it is intractable due to the large search space of the combination of $B^P$ and $B^Q$.

Alternatively, it has been found that an accurate approximation of the above Bayes filtering may be achieved with particle filtering. Particularly, the disclosed method may be a simplified version of a sequential importance resampling (SIR) particle filter. The particle filter represents the likelihood P(X) by random sampling. It computes the weight of each sample and selects those samples with the largest weights. See for example, P. Abbeel, "Particle Filters", UC Berkeley EEC S (November 2012)

(at people.eecs.berkeley.edu/·pabbeel/cs287-fa12/slides/ParticleFilters.pdf). The particle filter may be applied to the present point cloud registration method as follows.

The first part of the particle filtering is prediction, and here the disclosed method predicts the position and size of the overlap regions based on a Gaussian distribution:

$$p(B_{t+1}^{Pn}|\hat{B}^P) \sim N(\hat{B}^P, \sigma^2) \quad (13)$$

which is applied to the present cloud registration method when determining the overlap region samples N as already described above, and that is described above with operation 542.

Next, weighting is performed to compute the importance and/or weights of each sample. This is accomplished by the hamming distance equation (24) and (25) formed below and to select the best overlap region samples of the iteration.

Lastly, the SIR particle filtering includes resampling based on the computed weights to update the samples at a next iteration. The difference between the present method and the basic SIR particle filter is at this stage, the samples are resampled based on the distribution of weights in the original SIR method. In contrast, the present point registration method merely reuses the best overlap region sample with the maximum weight. Thus, the present method's resampling generates only one sample, or it can be stated that the method generates N replicate samples by copying the best sample from the previous iteration.

To these ends, the probability density function $p(B_t^P, B_t^Q|Z_t)$ may be represented by a set of particles $\{\omega_t^k, B_t^{Pk}, B_t^{Qk}\}_{k=1}^N$. However, the joint sampling space of $B_t^P$ and $B_t^Q$ is still too large, and a common solution to reduce the sampling space is to sample $B_t^P$ and $B_t^Q$ one by one. The formulation can be approximated by:

Predict $B_{t+1}^P$:

$$p(B_{t+1}^P|Z_t) = \int p(B_{t+1}^P|B_t^P) \cdot p(B_t^P|Z_t) dB_t^P \quad (14)$$

Update $B_{t+1}^P$:

$$p(B_{t+1}^P|Z_{t+1}) \propto p(Z_{t+1}|B_{t+1}^P, B_t^{Qbest}) \cdot p(B_{t+1}^P|Z_t) \quad (15)$$

Predict $B_{t+1}^Q$:

$$p(B_{t+1}^P|Z_t) = \int p(B_{t+1}^Q|B_t^Q) \cdot p(B_t^Q|Z_t) dB_t^Q \quad (16)$$

Update $B_{t+1}^Q$:

$$p(B_{t+1}^Q|Z_{t+1}) \propto p(Z_{t+1}|B_{t+1}^{Pbest}, B_{t+1}^Q) \cdot p(B_{t+1}^Q|Z_t) \quad (17)$$

where $p(B_{t+1}^P|B_t^P)$ and $p(B_{t+1}^Q|B_t^Q)$ are the proposal prediction function from a current state to the next state which are modeled by Gaussian distributions centered at $B_t^P$ and $B_t^Q$ and already applied by the overlap region sampling N, and $P(B_t^P|Z_t)$ and $P(B_t^Q|Z_t)$ are the probability density function which will be modeled by the particle filter.

As mentioned, the sampling of $B^P$ and $B^Q$ are separated and performed alternatively one by one. In the first stage, the process fixes $B^Q$ as $B_t^{Qbest}$ by selecting the best sample from the t-th iteration, and $B_{t+1}^P$ is sampled and updated. Then, in the second stage, the process fixes $B^P$ as $B_{t+1}^{Pbest}$ by selecting the best sample from the (t+1)-th iteration, and $B_{t+1}^Q$ is sampled and updated. The probability density function of $B_t^P$ and $B_t^Q$ are updated with their particles $\{\omega_t^{Pn}, B_t^{Pn}\}_{n=1}^N$ and $\{\omega_t^{Qn}, B_t^{Qn}\}_{n=1}^N$:

$$p(B_t^P|Z_t) \approx \sum_{n=1}^N \omega_t^{Pn} \delta(B^P - B_t^{Pn}) \quad (18)$$

$$p(B_t^Q|Z_t) \approx \sum_{n=1}^N \omega_t^{Qn} \delta(B^Q - B_t^{Qn}) \quad (19)$$

where δ( ) is a Dirac delta function, and $\omega_t^n$ implies the importance of the n-th sample. It is modeled by:

$$\omega_t^{Pn} = p(Z|B_t^{Pn'}, B_{t-1}^{Qbest}) \quad (20)$$

$$\omega_t^{Qn} = p(Z|B_t^{Pbest'}, B_t^{Qn}) \quad (21)$$

Then, the $B_t^{Qbest}$ and $B_t^{Pbest}$ are selected as those with the maximum observation probability:

$$B_t^{Qbest} = \underset{B_t^{Qn}}{\operatorname{argmax}} p(Z|B_t^{Pbest'}, B_t^{Qn}) \quad (22)$$

$$B_t^{Pbest} = \underset{B_t^{Pn}}{\operatorname{argmax}} p(Z|B_t^{Pn'}, B_{t-1}^{QBest}) \quad (23)$$

where $B_t^{Pbest'} = B_t^{Pbest} + T_t^n$ and $B_t^{Pn'} = R_t^n \cdot B_t^{Pn} + T_t^n$ are the transformed overlap regions from P to Q at the t-th iteration.

To simplify for implementation for the first stage, the weight equation (17) can be simplified as follows:

$$\omega_t^{Pn} = p(Z|B_t^{Pn'}, B_{t-1}^{Qbest}) = p(Z|B_t^{Pn}, \widehat{B^{Qn}}) \quad (24)$$

which simply places the weight in terms used by the present method, where $\widehat{B^{Qn}}$ is the best overlap region so far (whether initial on the first iteration or from the previous iteration). Weighting for each candidate $B_t^{Pn}$ can then be found as:

$$p(Z|B_t^{Pn}, \widehat{B^{Qn}}) = \exp^{-d\left(H_P(\hat{S}_t^{Pn} B_t^{Pn}), H_Q(\hat{S}_t^{Qn} \widehat{B^{Qn}})\right)} \quad (25)$$

which can be simplified to select the best sample that has the maximum weight (and in turn the minimum hamming distance).

$$n_{best} = \underset{n}{\operatorname{argmax}}(\omega_t^{Pn}) = \underset{n}{\operatorname{argmin}} d\left(H_P(\hat{S}_t^{Pn} B_t^{Pn}), H_Q(\hat{S}_t^{Qn} \widehat{B^{Qn}})\right) \quad (26)$$

and the best $B^P$ in this iteration is selected by:

$$(B_t^{Pbest}, S_t^{Pbest}, S_t^{Qbest}) = \underset{B_t^{Pn}, S_t^{Pn}, S_t^{Qn}}{\operatorname{argmin}} d(H_P(S_t^{Pn} \times B_t^{Pn}), H_Q(S_t^{Qn} \times \hat{B}^Q)) \quad (27)$$

where $B_t^{Pbest}$ is the best sample for $B^P$ at the t-th iteration, $(S_t^{Pbest}, S_t^{Qbest})$ is the corresponding principal axes pair, x is matrix multiplication, and d( ) is the Hamming distance defined in equation (2). In other words, the hamming distances are already computed by equation (7) when aligning the principal axes to the overlap region samples, and now the relevant hamming distances of the overlap region being analyzed need only be obtained from memory if the hamming distances are being stored.

The same or similar process is conducted to tune $B^Q$ that:

$$(B_t^{Qbest}, S_t^{Pbest}, S_t^{Qbest}) = \underset{B_t^{Qn}, S_t^{Pn}, S_t^{Qn}}{\operatorname{argmin}} d(H_P(S_t^{Pn} \times \hat{B}^P), H_Q(S_t^{Qn} \times B_t^{Qn})) \quad (28)$$

where $B_t^{Qbest}$ is the best sample for $B^Q$ at the t-th iteration, and $(S_t^{Pbest}, S_t^{Qbest})$ is the corresponding principal coordinate system pair.

To implement this operation then, process 500 may include "set n=0" 568, to reset the overlap region sample counter. Process 500 then may include "determine best overlap region $B_t^{Pbest}$ and best principal axes pair $(\hat{S}_t^{Pbest}, \hat{S}_t^{Qbest})$ for t" 569, and refers to applying equation (24) above for the first stage, and equation (25) for the second stage, which as mentioned, represents the posterior probability of the cloud registration method, and is performed by using a simplified SIR particle filter weighting.

This operation may include "obtain hamming distance d of best aligned principal axes pair $(\hat{S}_t^{Pn}, \hat{S}_t^{Qn})$ of n" 570, and as mentioned, by obtaining the relevant hamming distances d already computed when aligning the principal axes to the overlap region samples $B_t^{Pn}$.

Once the hamming distance is obtained for the current overlap region sample $B_t^{Pn}$ being analyzed, process 500 may include "save $B_t^{Pn}$ and $(\hat{S}_t^{Pn}, \hat{S}_t^{Qn})$ as best for t if hamming distance d is a minimum so far" 571. If not, the current overlap region sample $B_t^{Pn}$ is dropped. If so, the current overlap region sample $B_t^{Pn}$ is stored as mentioned.

Thereafter, process 500 may include the inquiry "n=N?" 572, to determine if all overlap region samples have been analyzed to determine the best overlap region sample $B_t^{Pn}$. If not, process 500 proceeds to "set n=n+1" 573, and the process loops back to operation 569 to apply equation (25) to the next overlap region sample $B_t^{Pn}$ to determine if it is the best overlap region sample so far. When the last overlap region sample N is reached, process 500 then may include "set last $B_t^{Pn}$, $\hat{S}_t^{Pn}$, $\hat{S}_t^{Qn}$ as $B_t^{Pbest}$, $\hat{S}_t^{Pbest}$, $\hat{S}_t^{Qbest}$" 574, thereby setting the best overlap region and corresponding aligned principal axes pair of the iteration.

Then, process 500 may include "compute rotation matrix $R_t^{best}$" 575, where given the candidate principal axes pair $S_t^{PQ}$, the selection of R and T is equal to the selection of an aligned principal coordinate pair. Thus, while using the cost equation (5) from above again, the conditional probability of the transformation given the overlap also may be measured by:

$$p(R,T|B^P,B^Q)=\exp^{-cost(Z(R\cdot B^P+T),Z(B^Q))} \tag{29}$$

Since the observation Z(B) is translation invariant, the optimization of transformation in terms of the rotation matrix may be converted to:

$$\hat{R} = \underset{R}{\operatorname{argmax}}\, p(R|B^P, B^Q) = \underset{S_k^P, S_k^Q}{\operatorname{argmax}} \exp^{-cost(Z(S_k^P B^P), Z(S_k^Q B^Q))} \tag{30}$$

where $S_k^P=[v_{k1}^P\ v_{k2}^P\ v_{k3}^P]$ and $S_k^Q=[v_{k1}^Q\ v_{k2}^Q\ v_{k3}^Q]$ are rotation matrices which are composed of principal axes extracted from the principal axes set $S^{PQ}$, k=1, 2, . . . K., where here K=24 as described above. By applying rotation $S_k^P$, and $S_k^Q$ to P and Q respectively, the two point clouds are in parallel coordinate systems. Thus, the rotation matrix from P to Q is obtained by:

$$R=(S_k^Q)^{-1} \times S_k^P \tag{31}$$

Describing the variables in terms of the aligned principal axes pairs $(\hat{S}_t^{Pn}, \hat{S}_t^{Qn})$, the equation for the rotation matrix from P to Q becomes:

$$\hat{R}=(\hat{S}^Q)^{-1} \times \hat{S}^P \tag{32}$$

where R is the rotation matrix from P to Q, where $\hat{R}$ is the optimal rotation matrix of R, and where the $\hat{R}$, $S_k^P$, and $S_k^Q$ are all 3×3 matrices. Applying the equation after the best overlap regions are determined for the iteration, the equation becomes:

$$R_t^{best}=(\hat{S}_t^{Qbest})^{-1} \times \hat{S}_t^{Pbest} \tag{33}$$

Process 500 then may include "compute translation $T_t^{best}$" 576. After the rotation matrix is estimated, the translation vector may be estimated by:

$$\hat{T}=\bar{q}-R\bar{p} \tag{34}$$

and as applied to the specific process here:

$$T_t^{best}=\bar{q}-R_t^{best}\bar{p} \tag{35}$$

where $\bar{q}$ and $\bar{p}$ are the averaged coordinate or the center points within $B^Q$ and $B^P$, respectively, and are each a 3×1 vector providing the coordinates [x y z]. Average here refers to the mean coordinate where:

$$\bar{p} = 1/N \sum_{n=1}^{N} p \tag{35.5}$$

where p is a point within $B^P$.

Thereafter, process 500 may include "apply test for updating" 577. This operation tests whether the best overlap region of one of the point clouds as re-aligned by the best rotation matrix is close to the best overlap region of the other cloud. The difference between the two is compared to the same difference using the last initial or best overlap regions. Thus, for the first stage, process 500 may include "for estimating $\hat{B}^P$ determine (578) if $$d(H_P(R_t^{best}B_t^{best}),H_Q(\widehat{B^{Qbest}}))>d(H_P(\hat{R}\hat{B}^P),H_Q(\widehat{B^Q}))" \tag{36}$$

where $\widehat{B^{Qbest}}$ is the best overlap region so far in the first stage while estimating $\hat{B}^P$, while $B_t^{Qbest}$ is the latest best $B_t^{Qbest}$ in the second stage while estimating $B^Q$. The hat ˆ is used on $\widehat{B^{Qbest}}$ to indicate that $\widehat{B^{Qbest}}$ the same center position as $\widehat{B^Q}$.

Similarly for the second stage, process 500 may include "for estimating $\hat{B}^Q$ determine (579) if $$d(H_P(R_t^{best}\hat{B}^P),H_Q(B_t^{Qbest}))>d(H_P(\hat{R}\hat{B}^P),H_Q(\widehat{B^Q}))" \tag{37}$$

in order to apply the same test to the best overlap region $B_t^{Qbest}$ of the second stage. These tests involve applying matrix multiplication to adjust the overlap regions by the indicated rotation matrices. The point location histograms here are generated as with the other histograms described above, and the hamming distance is determined between the two histograms.

Whether in the first stage or second stage, process 500 may include the inquiry "test satisfied?" 580 or 581. If the test is satisfied for the first stage, then process 500 may include "determine convergence differences" 582. For the first stage, this involves an operation to "determine center position difference between the latest best center position of $B_t^{Pbest}$ and the center position of the latest $\hat{B}^P$" 583, as well as "determine edge length difference between the latest best edge length of $B_t^{Pbest}$ and the edge length of the latest $\hat{B}^P$" 584. These two differences may be Euclidian distances as follows although other types of distances may be used as well.

$$D_{cP} = \sqrt{(\widehat{x^P} - x_t^{Pbest})^2 + (\widehat{y^P} - y_t^{Pbest})^2 + (\widehat{z^P} - z_t^{Pbest})^2} \quad (38)$$

$$D_{SP} = \sqrt{(\widehat{s^P} - s_t^{Pbest})^2} \quad (39)$$

where $(\widehat{x^P}, \widehat{y^P}, \widehat{z^P})$ and $(x_t^{Pbest}, y_t^{Pbest}, z_t^{Pbest})$ are the center position of $\hat{B}^P$ and $B_t^{Pbest}$ respectively, respectively, and $\widehat{s^P}$ and $s_t^{Pbest}$ are the edge length of $\hat{B}^P$ and $B_t^{Pbest}$ respectively.

With these two convergence differences, process 500 may include "update $\hat{R}=R_t^{best}$, $\hat{T}=T_t^{best}$" 585, to update the best R and T of the iteration t as the best R and T so far of all iterations. Process 500 then may include "set $\hat{B}^P=B_t^{Pbest}$" 586 to update $\hat{B}^P$ as well.

The process then proceeds to initiate the second stage. Thus, process 500 may include "repeat operations 536 to 588 (by switching Q with P in operations 536 to 586) to estimate $\hat{B}^Q$" 590. Thus, these operations are repeated except for estimating $\hat{B}^Q$. The operations are the same except as discussed above where different equations are applied and so forth. The process then loops to operation 536 to begin the second stage of the iteration t.

When the updating test is not satisfied in the first stage, the process 500 skips the determination of the convergence differences, proceeds to operation 586 to "set $\hat{B}^P=B_t^{Pbest}$", and then loops back to operation 590 and 536 to being the second stage of the iteration t.

Once the second stage is complete and a best overlap region $B_t^{Qbest}$ is determined and the update test is satisfied (580), process 500 then may determine convergence differences 582, and which may include "determine center position difference between the latest best center position of $B_t^{Qbest}$ and the center position of the latest $\hat{B}^Q$" 587. This also may be a Euclidian distance as follows.

$$D_{cQ} = \sqrt{(\widehat{x^Q} - x_t^{Qbest})^2 + (\widehat{y^Q} - y_t^{Qbest})^2 + (\widehat{z^Q} - z_t^{Qbest})^2} \quad (40)$$

where $(\widehat{x^Q}, \widehat{y^Q}, \widehat{z^Q})$ and $(x_t^{Qbest}, y_t^{Qbest}, z_t^{Qbest})$ are the center position of $\hat{B}^Q$ and $B_t^{Qbest}$, respectively. For the second stage convergence difference, the difference in edge length (or other dimensions) does not need to be used.

Process 500 also then may include "update $\hat{R}=R_t^{best}$, $\hat{T}=T_t^{best}$" 588, as with operation 585 of the first stage. Thereafter, process 500 may include "set $\hat{B}^Q=B_t^{Qbest}$" 589 to update $\hat{B}^Q$.

Once both stages of an iteration are complete, process 500 may include the inquiry "at least one update test satisfied?" 591 to determine which values are needed to determine if convergence has been reached, where the overlap regions do not change any more, or change very insignificantly, from iteration to iteration. If neither the first stage nor the second stage satisfied the update test, then the process 500 proceeds to "set t=t+1" 592, and the process loops back to operation 536 to start the next iteration t. The next inquiry is then to ask are "both tests satisfied?" 593. If both update tests are satisfied for both first and second stages of the iteration, then process 500 may include the convergence test: "do both center position differences and edge length difference meet a convergence criteria" 594. This ask whether all three convergence differences are less than a threshold:

$$D_{cP} < \theta_1 \text{ and } D_{cQ} < \theta_1 \text{ and } D_{SP} < \theta_2 \quad (41)$$

where $\theta_1$ and $\theta_2$ are predetermined thresholds set by experimentation or other methods. This threshold test has factors from both stages: both overlap region position and edge length are tested from the first stage, and overlap region position is tested from the second stage. If all three criteria are not satisfied, process 500 may include "set t=t+1" 595, and the process loops back to operation 536 to start the next iteration. If all three criteria are satisfied, process 500 may include "save $\hat{B}^P=B_t^{Pbest}$ and $\hat{B}^Q=B_t^{Qbest}$ and $\hat{R}=R_t^{best}$, $\hat{T}=T_t^{best}$ as the transformation between the two paired images" 596, and the cloud registration process ends. Other applications or programs such as 3D depth map or 3D model reconstruction can then use the transformation as described above.

When only one of the updating tests are satisfied in an iteration, process 500 may include "apply test for convergence" 597. This includes "when estimation $\hat{B}^P$ updating test is satisfied: use center position difference from last iteration t−1 for $\hat{B}^Q$" 598, or "when estimation $\hat{B}^Q$ updating test is satisfied: use center position difference and edge length difference from last iteration t−1 for $\hat{B}^P$" 599. In other words, instead of a new computed convergence difference (as in operation 582), the convergence differences from the last iteration are used in convergence threshold comparison test equation (38) instead. The process 500 then continues with operation 594 apply the thresholds in equation (38) to determine if convergence exists as already described above.

It will be appreciated that instead of thresholds for the convergence test, other tests could be used as well.

A summary of the method described above may be stated as follows in a psuedo-code style listing:

---

Input: Point cloud P and Q
  Output: Estimation of Rotation matrix $\hat{R}$, translation vector $\hat{T}$, overlap cuboids $\hat{B}^P$ and $\hat{B}^Q$.
  Initialize $\hat{B}^Q$, $\hat{B}^P$ by putting them in the center of P and Q, and manually setting their edge size.
  For t = 0 ... T
- Estimate $\hat{B}^P$:
    ○ Predict the center point "c=(x,y,z)" and edge size "s" for $B_t^{Pn}$, based on Gaussian distributions. n=0, 1,2,...49, set $B_t^{P0} = \hat{B}^P$ $$N(s, \widehat{s_P}, \sigma^2) = \frac{1}{\sqrt{2\pi}\,\sigma} \exp\left(-\frac{(s - \widehat{s_P})^2}{2\sigma^2}\right)$$

where $\widehat{s_P}$ is the edge size of $\hat{B}^P$ and $\sigma$ is predetermined $$N(c, \widehat{c_P}, \Sigma) = \frac{1}{(2\pi)^{\frac{3}{2}} |\Sigma|^{\frac{1}{2}}} \exp\left(-\frac{1}{2}(c - \widehat{c_P})^T \Sigma^{-1} (c - \widehat{c_P})\right)$$

where $\widehat{c_P}$ is the center point of $\hat{B}^P$ and $\Sigma$ is set to identity matrix
- ○ Generate 50 $\hat{B}_t^{Qn}$, n=0,1,...49, that each $\hat{B}^{Qn}$ has the same center position with $\hat{B}^Q$, and, the $\hat{B}^{Qn}$ have the same edge size with $B_t^{Pn}$ when they have the same n.
- ○ Do principal coordinate alignment for each cuboid pair ($B_t^{Pn}$, $\hat{B}^{Qn}$), n=0,...49. Denote the aligned coordinate system pair as ($\hat{S}_t^{Pn}$, $\hat{S}_t^{Qn}$)
  - ○ The input of this step is the overlap cuboid $B^P = B_t^{Pn}$, $B^Q = \hat{B}^{Qn}$, and the output is the principal coordinate system pair $$\left(\hat{S}_t^{Pn}, \hat{S}_t^{Qn}\right) = \underset{S_k^P, S_k^Q \in S^{PQ}}{\mathrm{argmax}} \ p\left(S_k^P, S_k^Q \mid B^P = B_t^{Pn}, B^Q = \hat{B}^{Qn}\right)$$

- ○ Select the best overlap region pair and its principal coordinate system ($B_t^{Pbest}$, $\hat{B}^{Qbest}$, $\hat{S}_t^{Pbest}$, $\hat{S}_t^{Qbest}$)
  - ○ Weighting for each candidate $B_t^{Pn}$:
    - ■ $\omega_t^{Pn} = p(Z \mid B_t^{Pn}, \widehat{B^{Qn}}) = \exp^{-d\left(H_P(\hat{S}_t^{Pn} B_t^{Pn}), H_Q(\hat{S}_t^{Qn} \widehat{B^{Qn}})\right)}$
  - ○ Thus, select the best sample who has the maximum weight
    - ■ $n_{best} = \underset{n}{\mathrm{argmax}}(\omega_t^{Pn}) = \underset{n}{\mathrm{argmin}} \ d\left(H_P\left(\hat{S}_t^{Pn} B_t^{Pn}\right), H_Q\left(\hat{S}_t^{Qn} \widehat{B^{Qn}}\right)\right)$ (7)

Where d(.) is the Hamming distance defined in equation (2)
  - ○ $\hat{S}_t^{Qbest} = \hat{S}_t^{Qnbest}$, $\hat{S}_t^{Pbest} = \hat{S}_t^{Pnbest}$, $B_t^{Pbest} = B_t^{Pnbest}$, $\hat{B}^{Qbest} = \hat{B}^{Qnbest}$
- ○ Compute $R_t^{best}$ and $T_t^{best}$ for the cuboid pair ($B_t^{Pbest}$, $\hat{B}^{Qbest}$)
  - ○ $R_t^{best} = (\hat{S}_t^{Qbest})^{-1} \times \hat{S}_t^{Pbest}$,
  - ○ $T_t^{best} = \hat{q} - R_t^{best}\hat{p}$,
- ○ Update $\hat{B}^P$, $\hat{R}$ and $\hat{T}$
  - ○ If $d\ (H_p(R_t^{best}B_t^{Pbest}), H_Q(B^{\overline{Qbest}})) > d\ (H_p(\hat{R}\hat{B}^P), H_Q(\widehat{B^Q}))$
    - ■ $D_{cP} = \sqrt{(\widehat{x^P} - x_t^{Pbest})^2 + (\widehat{y^P} - y_t^{Pbest})^2 + (\widehat{z^P} - z_t^{Pbest})^2}$, $D_{SP} = \sqrt{(\widehat{s^P} - s_t^{Pbest})^2}$ where $(\widehat{x^P}, \widehat{y^P}, \widehat{z^P})$ and $(x_t^{Pbest}, y_t^{Pbest}, z_t^{Pbest})$ are the center position of $\hat{B}^P$ and $B_t^{Pbest}$, respectively. $\widehat{s^P}$ and $s_t^{Pbest}$ are the edge size of $\hat{B}^P$ and $B_t^{Pbest}$, respectively
    - ■ $\hat{B}^P = B_t^{Pbest}$, $\hat{R} = R_t^{best}$, $\hat{T} = T_t^{best}$, $\hat{B}^Q = \hat{B}^{Qbest}$
  - ○ Resampling: $\hat{B}^P = B_t^{Pbest}$
- Estimate $\hat{B}^Q$:
  - ○ Predict the center point "c=(x, y, z)" for $B_t^{Qn}$ based on a Gaussian distribution. n=0,1,2,...49, set $B_t^{Q0} = \hat{B}^Q$ $$N(c, \widehat{c_Q}, \Sigma) = \frac{1}{(2\pi)^{\frac{3}{2}}|\Sigma|^{\frac{1}{2}}} \exp\left(-\frac{1}{2}(c - \widehat{c_Q})^T \Sigma^{-1}(c - \widehat{c_Q})\right)$$

where $\widehat{c_Q}$ is the center point of $\hat{B}^Q$ and $\Sigma$ is set to be identity matrix
  - ○ Set the edge size of all $B_t^{Qn}$ to be the same as $\hat{B}^P$.
  - ○ Do principal coordinate alignment for each cuboid pair ($\hat{B}^P$, $B_t^{Qn}$), n=0,...49. Denote the aligned coordinate system pair as ($\hat{S}_t^{Pn}$, $\hat{S}_t^{Qn}$)

$$\left(\hat{S}_t^{Pn}, \hat{S}_t^{Qn}\right) = \underset{S_i^P, S_i^Q \in S^{PQ}}{\mathrm{argmax}} \ p\left(S_i^P, S_i^Q \mid B^P = \hat{B}^P, B^Q = B_t^{Qn}\right)$$ (4)

- ○ Select the best cuboid and its principal coordinate system ($B_t^{Qbest}$, $\hat{S}_t^{Pbest}$, $\hat{S}_t^{Qbest}$) from all ($B_t^{Qn}$, $\hat{S}_t^{Pn}$, $\hat{S}_t^{Qn}$), k=0, 1,2,...49
  - ○ Weighting for each $B_t^{Qn}$:
    - ■ $\omega_t^{Qn} = p(Z \mid \hat{B}^P, B_t^{Qn}) = \exp^{-d\left(H_P(\hat{s}_t^{Pn}\hat{B}^P), H_Q(\hat{s}_t^{Qn} B_t^{Qn})\right)}$
  - ○ select the best sample who has the maximum weight
    - ■ $n_{best} = \underset{B_t^{Qn}, \hat{S}_t^{Pn}, \hat{S}_t^{Qn}}{\mathrm{argmin}} \ d\left(H_P\left(\hat{S}_t^{Pn} \hat{B}^P\right), H_Q\left(\hat{S}_t^{Qn} B_t^{Qn}\right)\right)$, (8)
    - ■ $B_t^{Qbest} = B_t^{Qnbest}$, $\hat{S}_t^{Pbest} = \hat{S}_t^{Pnbest}$, $\hat{S}_t^{Qbest} = \hat{S}_t^{Qnbest}$
  - ○ Compute $R_t^{best}$ and $T_t^{best}$ based on equation (5-6)
- ○ Update $\hat{B}^Q$, $\hat{R}$ and $\hat{T}$
  - ○ If $d\ (H_p(R_t^{best} \hat{B}^P), H_Q\ (B_t^{Qbest})) > d\ (H_p(\hat{R}\hat{B}^P), H_Q(\widehat{B^Q}))$
    - ■ $D_{cQ} = \sqrt{(\widehat{x^Q} - x_t^{Qbest})^2 + (\widehat{y^Q} - y_t^{Qbest})^2 + (\widehat{z^Q} - z_t^{Qbest})^2}$ where $(\overline{x^Q}, \overline{y^Q}, \overline{z^Q})$ and $(x_t^{Qbest}, y_t^{Qbest}, z_t^{Qbest})$ are the center position of $\hat{B}^Q$ and $B_t^{Qbest}$, respectively.
- ■ $\hat{B}^Q = B_t^{Qbest}$, $\hat{R} = R_t^{best}$, $\hat{T} = T_t^{best}$
- ○ Resampling: $\hat{B}^Q = B_t^{Qbest}$
- Convergence
  - If $D_{cP} < \theta_1$ and $D_{cQ} < \theta_1$ and $D_{SP} < \theta_2$, the iteration stops, else go to the next iteration. $\theta_1$ and $\theta_2$ are thresholds which are manually set by users.

End

Evaluations

The disclosed point cloud registration method was evaluated on two datasets. A Realsense™ dataset was captured to obtain a point cloud with 317 RGBD images. This dataset was tested for point cloud registration on rotation changes. The second dataset is a 7Scenes Dataset captured by using Kinect®. See J. Shotton et al., "Scene coordinate regression forests for camera relocalization in rgb-d images," in Proceedings of the IEEE Conference on Computer Vision and Pattern Recognition, pp. 2930-2937 (2013).

Referring to FIGS. 6-11, an images was reconstructed using 5 conventional methods as well as the present cloud registration method, and then compared. The RGBD image pairs that were used show a scene with a kitchen and office folders with small overlaps.

To test the performance of the registration algorithm, the pairwise alignment error was measured between the ground-truth pose and the estimated pose using relative rotational error $E_R$ and relative translational error $E_T$:

$$E_R = \Sigma_{i=1}^{1} |F_i(R_G^{-1} \times \hat{R})| \tag{42}$$

where $R_G$ is the ground truth rotation matrix, and $\hat{R}$ is the estimated rotation matrix, and and F( ) transforms a rotation matrix to three Euler angles.

$$E_T = \|T_G - \hat{T}\|_2 \tag{43}$$

where $T_G$ is the ground truth translation vector and $\hat{T}$ is the estimated translation vector.

Robustness to Large Rotation

First, the performance of the point cloud registration method was tested with respect to different rotations on the Realsense™ dataset. Different rotations were applied to the point cloud. The registration results are shown in Table 1 below.

TABLE 1

Registration results on point clouds with rotations
Relative Rotational Error ER (On the Realsense ™ dataset)

| Rotation | 30° | 60° | 90° | 120° | 150° |
|---|---|---|---|---|---|
| ICP (Besl et al.) | 0.35 | 4.43 | 27.36 | 35.99 | 40.21 |

TABLE 1-continued

Registration results on point clouds with rotations
Relative Rotational Error ER (On the Realsense ™ dataset)

| | | | | | |
|---|---|---|---|---|---|
| Generalized-ICP (Segal et al.) | 0.31 | 5.23 | 37.59 | 31.69 | 29.47 |
| Go-ICP (See (a) below) | 0.22 | 3.78 | 19.23 | 40.58 | 38.33 |
| Trimmed-ICP (See Chetverikov et al.) | 0.23 | 3.08 | 17.19 | 28.41 | 21.55 |
| The present method | 1.58 | 3.34 | 6.14 | 8.47 | 6.48 |

(a) J. Yang, et at., Go-ICP; Solving 3d registration efficiently and globally optimally, ICCVm, pp.1457-1464 (2013)

It can be seen that the present method outperforms the other conventional methods when the rotation angle is larger than 60°. Since the present method is based on principal axes (principal coordinate) alignment and principal axis extraction, which are, in theory, invariant to rotation changes, the present method achieves a relative stable rotation estimation result with different rotation changes. Especially, our method works well even when the rotation angle is larger than 90° while the other methods totally fail.

Robustness to Small Overlaps

The registration performance of the point cloud registration method was tested on point clouds with small overlaps as well. The overlap in the test image pairs from the 7 scenes (See J. Shotton et al. cited above) dataset ranges from 13% to 50%. The overlap ratio (or) between two point clouds P and Q is defined as the ratio of the number of their intersection points to their union points:

$$or = \frac{N(T(P) \cap Q)}{N(T(P)) + N(Q) - N(T(P) \cap Q)} \tag{44}$$

where T(P) is the transformed point cloud by the ground truth transformation matrix. N( ) is the number of points. If the distance from a point in P to a point in Q is smaller than a threshold, they are taken as one element in the intersection of P and Q. The registration error is shown in Table 2 below. Examples of the registration results are shown in FIGS. 6-11. It can be seen that with decreasing overlap ratio, the present method provides consistent good results while the other conventional methods perform worse.

TABLE 2

Registration error towards small overlaps

| Methods | Measurements | 40%< or <50% | 30%< or <40% | 20%< or <30% | <20% |
|---|---|---|---|---|---|
| ICP | $E_R$ | 14.11 | 43.72 | 37.59 | 55.82 |
| (Besl et al.) | $E_T$ | 0.37 | 0.75 | 1.23 | 0.99 |
| Generalized-ICP | $E_R$ | 17.56 | 38.05 | 42.74 | 51.69 |
| (Segal et al.) | $E_T$ | 0.25 | 0.89 | 1.58 | 1.24 |
| Go-ICP | $E_R$ | 20.25 | 42.35 | 35.56 | 38.45 |
| (See Yang et al.) | $E_T$ | 0.94 | 0.86 | 0.91 | 1.05 |

TABLE 2-continued

Registration error towards small overlaps

| Methods | Measurements | 40%< or <50% | 30%< or <40% | 20%< or <30% | <20% |
|---|---|---|---|---|---|
| Trimmed-ICP | $E_R$ | 6.98 | 12.39 | 23.41 | 35.59 |
| (See Chetverikov) | $E_T$ | 0.21 | 0.33 | 0.34 | 0.58 |
| the present method | $E_R$ | 7.21 | 7.23 | 8.78 | 13.25 |
|  | $E_T$ | 0.24 | 0.39 | 0.28 | 0.51 |

Referring to FIGS. 6-11, image 600 shows the ground truth registered point cloud, image 700 shows the result of ICP, image 800 shows the result of Generative-ICP, image 900 shows the result of Go-ICP, image 1000 shows the result of Trimmed-ICP, and image 1100 shows the Result of the Present Method.

Computational Complexity Evaluation

The computational time of each algorithm is counted for registering two point clouds generated by VGA sized RGBD image pairs. The number of points in each point cloud is around 300,000, and the computational costs of one iteration are shown in Table 3. The computational time of our method is only half of the ICP. Table 3 clearly shows that the present cloud registration method improves the functioning of the computer, computing device, and/or camera, and so forth operating the cloud registration method.

TABLE 3

Computational cost of different method

| ICP (Besl et al.) | Generative-ICP (Segal et al.) | Go-ICP (Yang et al.) | Trimmed-ICP (Chetverikov et al.) | The present method |
|---|---|---|---|---|
| 3.44 s (1 iters) | 2.98 s (1 iters) | 2.65 s (MSEThresh = 0.001) | 10.47 s (1 iters) | 1.58 s (1 iters) |

Conclusion

The difference between the state-of-the-art and this disclosure is summarized in Table 4 below, and the advantages of this disclosure is listed in Table 5 below.

This disclosure proposed a new framework for Manhattan point cloud registration. It makes use of the geometric priors in Manhattan scenes, defines a principal coordinate system for the point cloud, and introduces a registration method based on the principal coordinate system.

The disclosed method uses the overlap region, and by one example in the form of a cuboid, for overlap representation while traditional methods use low level geometry descriptors such as points and lines. The advantage of the present method is to explicitly estimate the overlap region, which accurately removes the irrelevant regions, leading to robustness towards small overlapped scenes.

The disclosed method estimates the transformation by principal coordinate alignment, while traditional methods depend on low level and local feature description and matching. Since the principal coordinate alignment is based on global cuboid features, it is more robust than traditional methods to large rotations.

The disclosed method is fast due to the sparse space for principal coordinate alignment, while traditional methods are slow due to the large number of feature correspondence at every iteration.

TABLE 4

Difference between the state-of-the-art with this disclosure

| Methods | State-of-the-art | Disclosed Method |
|---|---|---|
| Overlap Representation | Point, line, . . . | Three-dimensional overlap region (e.g., cuboid or cube) |
| Non-overlap Removing | Local feature matching | Overlap estimation with global features |
| Transformation Estimation | Low level Geometry alignment | High level principal axes (coordinate) alignment |

TABLE 5

Advantages of this disclosure in terms of the registration results

| Results | State-of-the-art | This disclosure |
|---|---|---|
| 20% < Overlap Ratio < 50% | × | ✓ |
| Rotation >60° | × | ✓ |
| Transformation Parameter Space | Sparse/Dense | Sparse |

In addition, any one or more of the operations of FIGS. 3 and 5A-5G may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
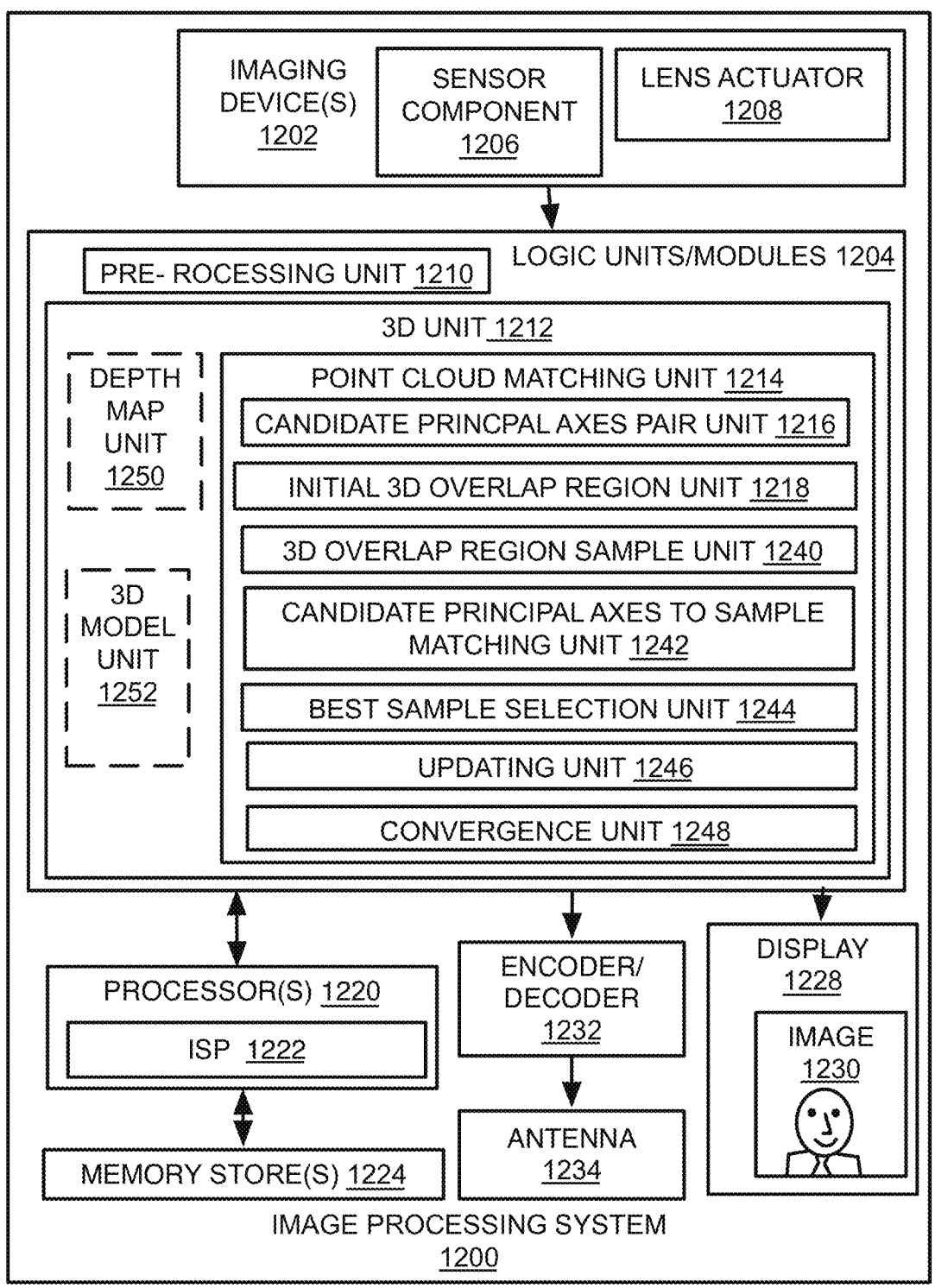
FIG. 12 is an illustrative diagram of an example system.

Referring to FIG. 12, an example image processing system 1200 is arranged in accordance with at least some implementations of the present disclosure. In various implementations, the example image processing system 1200 may have an imaging device 1202 to form or receive captured image data. This can be implemented in various ways. Thus, in one form, the image processing system 1200 may be one or more digital cameras or other image capture devices, and imaging device 1202, in this case, may be the camera hardware and camera sensor software, module, or component 1204. In other examples, imaging processing system 1200 may have an imaging device 1202 that includes or may be one or more cameras, and logic modules 1204 may communicate remotely with, or otherwise may be communicatively coupled to, the imaging device 1202 for further processing of the image data.

Thus, image processing device 1200 may be one or more cameras on a multi-use device such as a smartphone, tablet, laptop, or other mobile device, or even a computer or other computing device. Otherwise, device 1200 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that may or may not provide a preview screen, or some combination of these. Thus, in one form, imaging device 1202 may include camera hardware and optics including one or more sensors as well as auto-focus, zoom, aperture, ND-filter, auto-exposure, flash, and actuator controls. These controls may be part of a sensor module or component 1206 for operating the sensor. The sensor component 1206 may be part of the imaging device 1202, or may be part of the logical modules 1204 or both. Such sensor component can be used to generate images for a viewfinder and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1202 may be provided with an eye tracking camera.

The imaging device 1202 also may have a lens actuator 1208 that has a lens and a lens driver or driver logic that receives commands to move the lens and applies an electrical current to move the lens. The imaging device 1202 may have any other relevant component for capturing images consistent with the method and system described herein.

In the illustrated example, the logic modules 1204 may include a pre-processing unit 1210 that receives and modifies raw image data for further processing and as described above. The logic modules also may include a 3D unit 1212 that, in turn, includes a point cloud matching unit 1214 and optionally a depth map unit 1250, 3D model unit 1252, and/or other such applications that may use point cloud registration. By one form, the depth map unit 1250 may use the point cloud registration transformation for rectification as mentioned above and before reconstructing a 3D space.

The point cloud registration unit 1214 may have a candidate principal axes pair unit 1216, an initial 3D overlap region unit 1218, a 3D overlap region sample unit 1240, a candidate principal axes to sample matching unit (or principal axes (or coordinate system) alignment unit) 1242, a best sample selection unit 1244, an updating unit 1246, and a convergence unit 1248, where each unit is arranged to perform operations mentioned above with tasks related to the titles of the units here. The logic modules 1204 may or may not be located physically separate from the imaging device, and regardless of any physical separation, the logic modules 1204 still may be considered to be part of the imaging device when performing tasks on data provided by the imaging device. It will also be understood that any of these units may include any code or hardware that is used to perform the tasks suggested by the title of the unit, and may or may not actually be a physically separate object, or separate section of code, from other objects or code that perform other tasks.

The image processing system 1200 may have one or more processors 1220 which may include a dedicated image signal processor (ISP) 1222 such as the Intel Atom, memory stores 1224 which may or may not hold point cloud or other data related to the point cloud registration, one or more displays 1228 to provide images 1230, encoder/decoder 1232, and antenna 1234. In one example implementation, the image processing system 100 may have the display 1228, at least one processor 1220 communicatively coupled to the display, and at least one memory 1224 communicatively coupled to the processor. The encoder/decoder 1232 and antenna 1234 may be provided to compress the modified image date for transmission to other devices that may display or store the image. It will be understood that the encoder/decoder 1232 may include a decoder to receive and decode image data for processing by the system 1200, including point cloud registration by the 3D unit 1214. Otherwise, the processed image 1230 may be displayed on display 1228 or stored in memory 1224. As illustrated, any of these components may be capable of communication with one another and/or communication with portions of logic modules 1204 and/or imaging device 1202. Thus, processors 1220 may be communicatively coupled to both the image device 1202 and the logic modules 1204 for operating those components. By one approach, although image processing system 1200, as shown in FIG. 12, may include one particular set of blocks or actions associated with particular components or modules, these blocks or actions may be associated with different components or modules than the particular component or module illustrated here.

Figure 13:
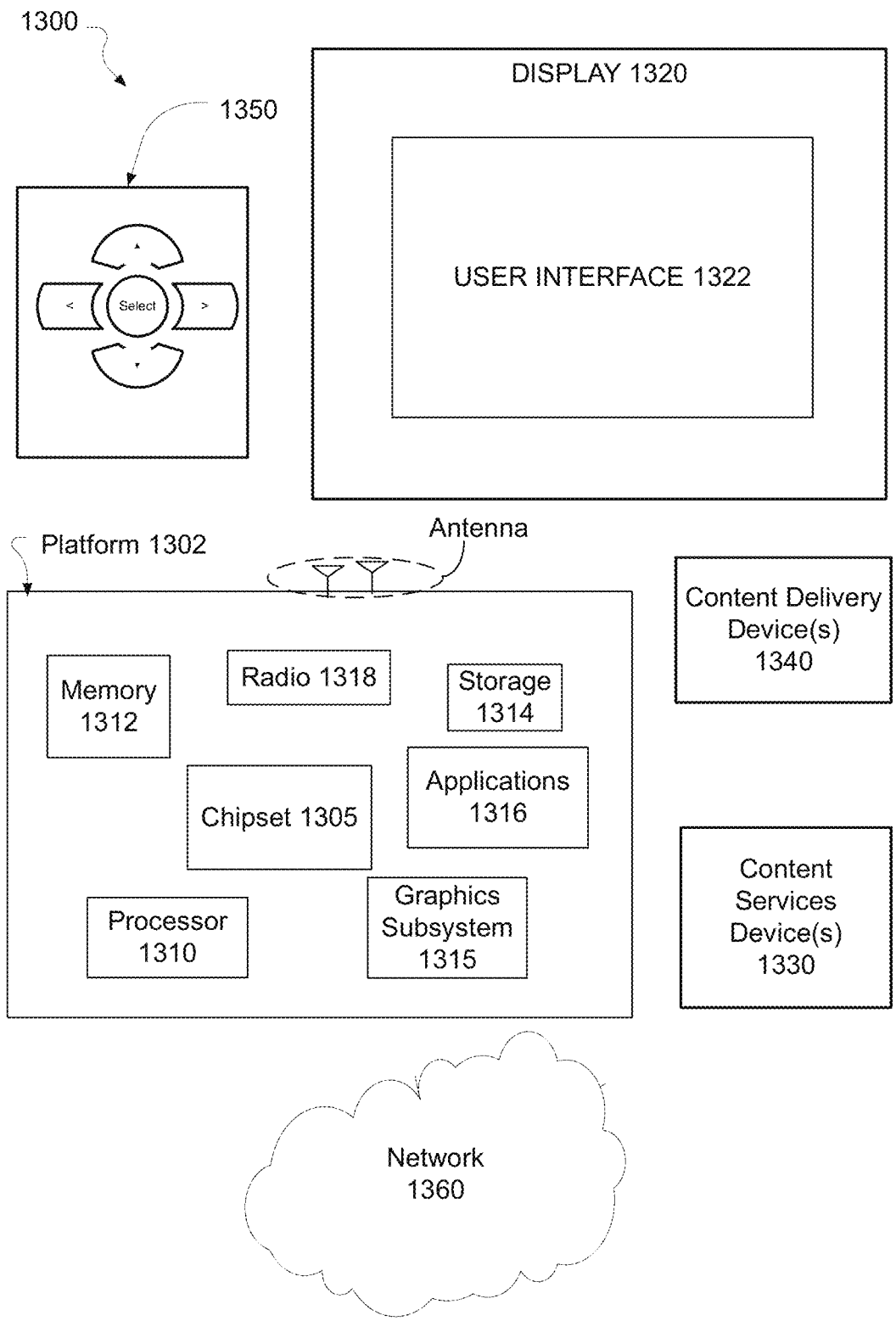
FIG. 13 is an illustrative diagram of another example system.

Referring to FIG. 13, an example system 1300 in accordance with the present disclosure operates one or more aspects of the image processing system described herein. It will be understood from the nature of the system components described below that such components may be associated with, or used to operate, certain part or parts of the image processing system 1800 described above. In various implementations, system 1300 may be a media system although system 1300 is not limited to this context. For example, system 1300 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
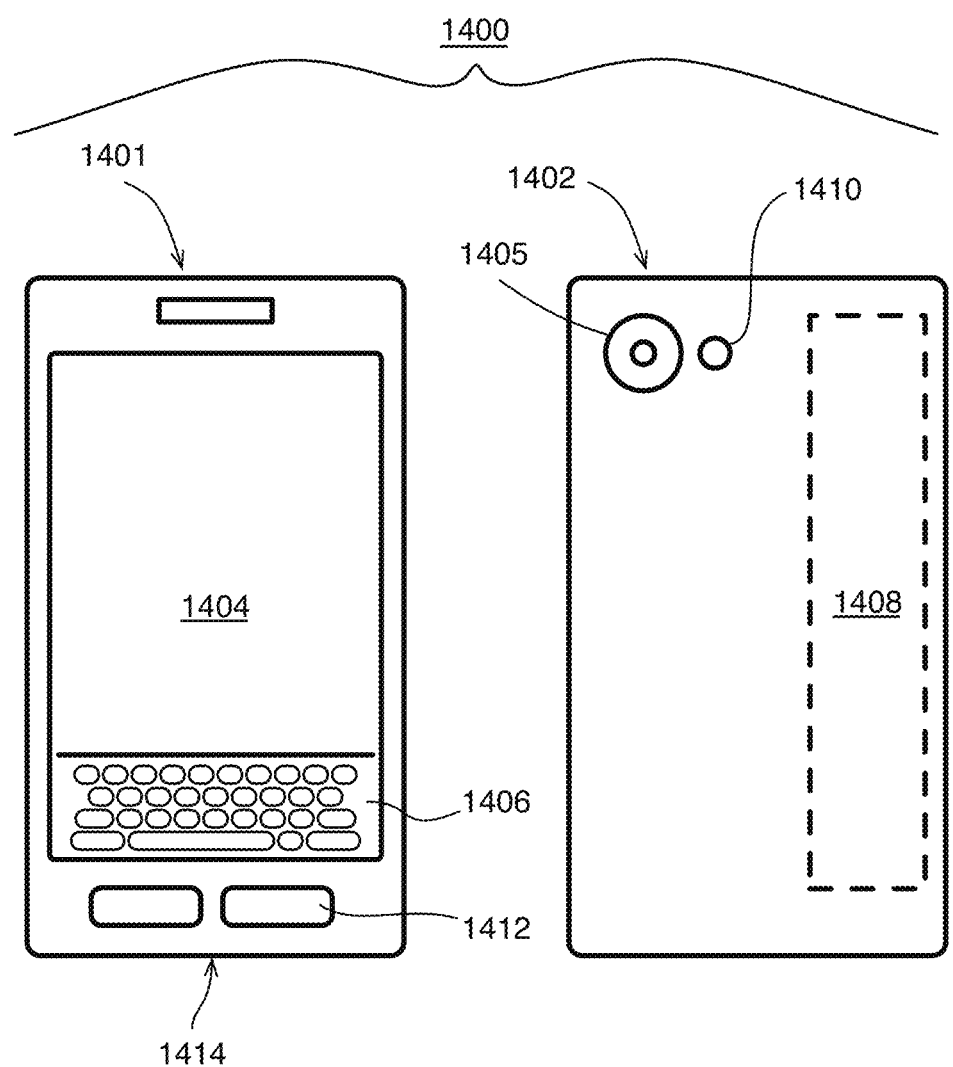
FIG. 14 illustrates another example device, all arranged in accordance with at least some implementations of the present disclosure.

Referring to FIG. 14, a small form factor device 1400 is one example of the varying physical styles or form factors in which systems 1200 or 1300 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone 1414, or may be digitized by a voice recognition device. As shown, device 1400 may include a camera 1405 (e.g., including at least one lens, aperture, and imaging sensor) and a flash 1410 integrated into back 1402 (or elsewhere) of device 1400. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of point registration for image processing comprises obtaining image data of multiple images of the same scene from one or more cameras and including a first image and a second image each respectively being associated with a first point cloud and a second point cloud both separately forming the scene; generating three-dimensional first and second overlap regions each respectively enclosing points from, and having a position and dimensions in, the respective first and second point cloud; iteratively modifying the position or dimensions or both of the first and second overlap regions to generate best first and second overlap regions so far of each iteration and until a convergence criteria is met; and establishing a transformation at least partially based on the best overlap regions, and the transformation comprising a rotation part, a translation part, or both to convert point locations between the first and second point clouds.

By another implementation, the method may include determining a convergence exists depending on whether a difference in position or dimensions or both of the best overlap regions from one iteration to another meets a convergence criteria; forming a set of candidate principal axes pairs comprising determining at least one principal axes formed by using the first point cloud to be paired with a principal axes formed by using the second point cloud; generating a set of overlap region samples with variations in position or dimensions or both of that of initial first and second overlap regions that are initial relative to an individual iteration; iteratively matching a best principal axes pair of the set of candidate principal axes pairs to individual overlap region samples; and at each iteration, selecting the best overlap region sample and matched best principal axes pair among all of the overlap region samples depending on a difference in point distribution of (1) the overlap region sample of one of the first and second point clouds and (2) an overlap region of the other of the first and second point clouds.

The method also comprises pairing principal axes respectively of the first and second point clouds; using a Manhattan world assumption to detect planes used to form the principal axes; forming principal axes from two normals respectively of detected perpendicular planes and computing the third axis by using the two normals to form three axes for each principal axes; performing the pairing by comparing color or luminance image data histograms along each axis of the principal axes being considered for pairing, wherein each iteration has a first stage and a second stage, during the first stage, the method comprising determining a plurality of first-stage overlap region samples as variations of the first overlap region, and determining a plurality of second overlap region variations each maintaining the center point of the second overlap region to compare the second overlap region variations to individual first-stage overlap region samples to determine the first best overlap region, and during the second stage.

This method also comprising determining a plurality of second-stage overlap region samples as variations of the second overlap region, and comparing the second-stage overlap region samples to the first best overlap region to determine the second best overlap region, wherein the variations of the first-stage overlap region samples are variations in both center point and edge dimensions relative to the first overlap region, and the variations of the second-stage overlap region samples are variations in center point relative to the second overlap region while using the same edge dimensions as the best first overlap region from the first stage; determining, at each iteration, a single best overlap region corresponding to the first overlap region and a single best overlap region corresponding to the second overlap region; and using the two single best overlap regions as initial first and second overlap regions at a next iteration by using the position and dimensions of the best overlap regions in the next iteration and in the first and second point clouds, and without maintaining other weighted data from iteration to iteration; estimating the probability of a rotation and translation part of the transformation and best first and second overlap regions of the first and second point clouds given observations of the point clouds, wherein the estimating comprises determining a conditional probability and a posterior probability; and the iteratively matching a best principal axes pair of the set of candidate principal axes pairs to individual overlap region samples to be performed to represent the conditional probability, and at each iteration, the selecting of the best overlap region sample and matched best principal axes pair to be performed to represent the posterior probability.

By a further implementation, a computer-implemented system of A computer-implemented system of point cloud registration for image processing, comprising: a display; at least one processor communicatively coupled to the display; at least one memory communicatively coupled to at least one processor; and a 3D unit operated by the processor and to operate by: obtaining image data of multiple images of the same scene from one or more cameras and including a first image and a second image each respectively being associated with a first point cloud and a second point cloud both separately forming the scene; generating three-dimensional first and second overlap regions each respectively enclosing points from, and having a position and dimensions in, the respective first and second point cloud; iteratively modifying the position or dimensions or both of the first and second overlap regions to generate best first and second overlap regions so far of each iteration and until a convergence criteria is met; and establishing a transformation at least partially based on the best overlap regions, and the transformation comprising a rotation part, a translation part, or both to convert point locations between the first and second point clouds.

As another alternative, the system's 3D unit may be provided to operate so that the first and second overlap regions are initial overlap regions of individual iterations, and wherein the iteratively modifying the position or dimensions or both of the first and second overlap regions comprises generating a set of overlap region samples that are variations of the first or second overlap region, wherein the overlap region samples are varied from the initial overlap regions by use of Gaussian distribution-based random sampling of variations of the position, dimensions, or both of the initial first or second overlap region; generating a set of candidate principal axes pairs, each pair having principal axes from the first point cloud and principal axes from the second point cloud; and determining a best match between one of the candidate principal axes and individual overlap region samples, wherein determining the best match comprises differencing an individual overlap region sample varied from the first overlap region, and differenced from one of plurality of variation overlap regions maintained with an initial center point position of the second overlap region but varied to have an edge length matching the edge length of the overlap region sample being compared to, wherein determining the best match comprises differencing an individual overlap region sample varied from the second overlap region, and differenced from the first overlap region. The method also comprises adjusting the overlap region sample to align with the principal axes of one of the candidate principal axes pair, and adjusting the overlap region to be compared to the overlap region sample by aligning the overlap region with the other principal axes of the one candidate principal axes pair before performing the differencing, wherein the differencing comprises dividing the overlap region sample and the overlap region being compared into bins, and counting the number of points of the first and second point clouds in each bin; the method comprising providing a binary histogram for the overlap region sample and the overlap region being compared to by providing a 1 or 0 if there are more point than a threshold in one of the bins and the other of 1 or 0 if there are less points than the threshold in one of the bins, wherein the difference to accomplish the differencing is a hamming difference between the histograms of the overlap region sample and the overlap region being compared to, and a candidate principal axes pair causing the smallest hamming distance associated with an overlap region sample, among all of the candidate principal axes pairs, to be considered a match to the overlap region sample.

As another implementation, a computer-readable medium having stored thereon instructions that when executed cause a computing device to operate by obtaining image data of multiple images of the same scene from one or more cameras and including a first image and a second image each respectively being associated with a first point cloud and a second point cloud both separately forming the scene; generating three-dimensional first and second overlap regions each respectively enclosing points from, and having a position and dimensions in, the respective first and second point cloud; iteratively modifying the position or dimensions or both of the first and second overlap regions to generate best first and second overlap regions so far of each iteration and until a convergence criteria is met; and establishing a transformation at least partially based on the best overlap regions, and the transformation comprising a rotation part, a translation part, or both to convert point locations between the first and second point clouds.

As another option, the instructions execute the computing device to operate by generating a set of candidate principal axes pairs, each pair having principal axes from the first point cloud and principal axes from the second point cloud; determining a best match between one of the candidate principal axes and individual overlap region samples that are each a variation in position or edge length or both of the first or second overlap region; and determining a best overlap region of the iteration by determining the overlap region sample with the least difference between: (1) an overlap region sample adjusted to align to a principal axes of the principal axes pair matched to the overlap region and associated with the first or second point cloud, and (2) the other of the first or second overlap region adjusted to align to the other principal axes of the matching principal axes pair, wherein the least difference refers to a difference in point distribution associated with the adjusted overlap region sample and first or second adjusted overlap region, wherein the least difference refers to a hamming difference between binary histograms of point distributions of the adjusted overlap region sample and the first or second overlap region, wherein the hamming distances were already established and used to match principal axes to overlap region samples.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method comprising:
    obtaining image data of multiple images of the same scene and including a first image and a second image each respectively being associated with a first point cloud and a second point cloud both separately forming the scene and both being within a separate bounding box;
    generating three-dimensional cuboid first and second overlap regions each with cuboid dimensions set relative to one of the bounding boxes rather than limiting the cuboid dimensions to be measured from or on points of the first and second point clouds, and each respectively enclosing points from the first and second point cloud;
    iteratively modifying the position or cuboid dimensions or both of the first and second overlap regions to generate best first and second overlap regions so far of each iteration and until a convergence criteria is met, wherein convergence at least partly depends on using the cuboid dimensions; and
    establishing a transformation at least partially based on the best overlap regions, and the transformation comprising a rotation part, a translation part, or both to convert point locations between the first and second point clouds.

2. The method of claim 1 comprising determining a convergence exists depending on whether a difference in position or cuboid dimensions or both of the best overlap regions from one iteration to another meets a convergence criteria.

3. The method of claim 1 comprising:
    forming a set of candidate principal axes pairs comprising determining at least one principal axes formed by using the first point cloud to be paired with a principal axes formed by using the second point cloud;
    generating a set of overlap region samples with variations in position or cuboid dimensions or both of that of initial first and second overlap regions that are initial relative to an individual iteration;
    iteratively matching a best principal axes pair of the set of candidate principal axes pairs to individual overlap region samples; and
    at each iteration, selecting the best overlap region sample and matched best principal axes pair among all of the overlap region samples depending on a difference in point distribution of (1) the overlap region sample of one of the first and second point clouds and (2) an overlap region of the other of the first and second point clouds.

4. The method of claim 1 comprising pairing principal axes respectively of the first and second point clouds.

5. The method of claim 4 comprising using a Manhattan world assumption to detect planes used to form the principal axes.

6. The method of claim 5 comprising forming principal axes from two normals respectively of detected perpendicular planes and computing the third axis by using the two normals to form three axes for each principal axes.

7. The method of claim 4 comprising performing the pairing by comparing color or luminance image data histograms along each axis of the principal axes being considered for pairing.

8. The method of claim 1 wherein each iteration has a first stage and a second stage; and the method comprising:
    during the first stage, determining a plurality of first-stage overlap region samples as variations of the first overlap region, and determining a plurality of second overlap region variations each maintaining the center point of the second overlap region to compare the second overlap region variations to individual first-stage overlap region samples to determine the first best overlap region; and
    during the second stage, determining a plurality of second-stage overlap region samples as variations of the second overlap region, and comparing the second-stage overlap region samples to the first best overlap region to determine the second best overlap region.

9. The method of claim 8 wherein the variations of the first-stage overlap region samples are variations in both center point and cuboid edge dimensions relative to the first overlap region, and the variations of the second-stage overlap region samples are variations in center point relative to the second overlap region while using the same edge dimensions as the best first overlap region from the first stage.

10. The method of claim 1 comprising determining, at each iteration, a single best overlap region corresponding to the first overlap region and a single best overlap region corresponding to the second overlap region; and using the two single best overlap regions as initial first and second overlap regions at a next iteration by using the position and cuboid dimensions of the best overlap regions in the next iteration and in the first and second point clouds, and without maintaining other weighted data from iteration to iteration.

11. The method of claim 1 comprising estimating the probability of a rotation and translation part of the transformation and best first and second overlap regions of the first and second point clouds given observations of the point clouds, wherein the estimating comprises determining a conditional probability and a posterior probability; and
    the iteratively matching a best principal axes pair of the set of candidate principal axes pairs to individual overlap region samples to be performed to represent the conditional probability, and
    at each iteration, the selecting of the best overlap region sample and matched best principal axes pair to be performed to represent the posterior probability.

12. A computer-implemented system of point cloud registration for image processing, comprising:
    a display;
    at least one processor communicatively coupled to the display;

at least one memory communicatively coupled to at least one processor; and the at least one processor to operate by:

obtaining image data of multiple images of the same scene from one or more cameras and including a first image and a second image each respectively being associated with a first point cloud and a second point cloud both separately forming the scene and both being within a separate bounding box;

generating three-dimensional cuboid first and second overlap regions each with cuboid dimensions set relative to one of the bounding boxes without limiting the cuboid dimensions to be measured from or on points of the first and second point clouds, and each respectively enclosing points from the first and second point cloud;

iteratively modifying the position or cuboid dimensions or both of the first and second overlap regions to generate best first and second overlap regions so far of each iteration and until a convergence criteria is met, wherein convergence at least partly depends on using the cuboid dimensions; and establishing a transformation at least partially based on the best overlap regions, and the transformation comprising a rotation part, a translation part, or both to convert point locations between the first and second point clouds.

13. The system of claim 12 wherein the first and second overlap regions are initial overlap regions of individual iterations, and wherein the iteratively modifying the position or cuboid dimensions or both of the first and second overlap regions comprises generating a set of overlap region samples that are variations of the first or second overlap region.

14. The system of claim 13 wherein the overlap region samples are varied from the initial overlap regions by use of Gaussian distribution-based random sampling of variations of the position, cuboid dimensions, or both of the initial first or second overlap region.

15. The system of claim 13 wherein the at least one processor to operate by:

generating a set of candidate principal axes pairs, each pair having principal axes from the first point cloud and principal axes from the second point cloud; and determining a best match between one of the candidate principal axes and individual overlap region samples.

16. The system of claim 15 wherein determining the best match comprises differencing an individual overlap region sample varied from the first overlap region, and differenced from one of plurality of variation overlap regions maintained with an initial center point position of the second overlap region but varied to have an edge length matching the edge length of the overlap region sample being compared to.

17. The system of claim 15 wherein determining the best match comprises differencing an individual overlap region sample varied from the second overlap region, and differenced from the first overlap region.

18. The system of claim 17 wherein the at least one processor to operate by: adjusting the overlap region sample to align with the principal axes of one of the candidate principal axes pair, and adjusting the overlap region to be compared to the overlap region sample by aligning the overlap region with the other principal axes of the one candidate principal axes pair before performing the differencing.

19. The system of claim 18 wherein the differencing comprises dividing the overlap region sample and the overlap region being compared into bins, and counting the number of points of the first and second point clouds in each bin.

20. The system of claim 19 wherein the at least one processor to operate by: providing a binary histogram for the overlap region sample and the overlap region being compared to by providing a 1 or 0 if there are more point than a threshold in one of the bins and the other of 1 or 0 if there are less points than the threshold in one of the bins.

21. The system of claim 20 wherein the difference to accomplish the differencing is a hamming difference between the histograms of the overlap region sample and the overlap region being compared to, and a candidate principal axes pair causing the smallest hamming distance associated with an overlap region sample, among all of the candidate principal axes pairs, to be considered a match to the overlap region sample.

22. A computer-readable medium having stored thereon instructions that when executed cause a computing device to operate by:

obtaining image data of multiple images of the same scene and including a first image and a second image each respectively being associated with a first point cloud and a second point cloud both separately forming the scene and both being within a bounding box;

generating three-dimensional cuboid first and second overlap regions each with cuboid dimensions set relative to one of the bounding boxes without limiting the cuboid dimensions to be measured from or on points of the first and second point clouds, and each respectively enclosing points from the first and second point cloud;

iteratively modifying the position or cuboid dimensions or both of the first and second overlap regions to generate best first and second overlap regions so far of each iteration and until a convergence criteria is met, wherein convergence at least partly depends on using the cuboid dimensions; and establishing a transformation at least partially based on the best overlap regions, and the transformation comprising a rotation part, a translation part, or both to convert point locations between the first and second point clouds.

23. The computer-readable medium of claim 22 comprising:

generating a set of candidate principal axes pairs, each pair having principal axes from the first point cloud and principal axes from the second point cloud;

determining a best match between one of the candidate principal axes and individual overlap region samples that are each a variation in position or edge length or both of the first or second overlap region; and determining a best overlap region of the iteration by determining the overlap region sample with the least difference between:

(1) an overlap region sample adjusted to align to a principal axes of the principal axes pair matched to the overlap region and associated with the first or second point cloud, and (2) the other of the first or second overlap region adjusted to align to the other principal axes of the matching principal axes pair.

24. The computer-readable medium of claim 23 wherein the least difference refers to a difference in point distribution associated with the adjusted overlap region sample and first or second adjusted overlap region.

25. The computer-readable medium of claim 23 wherein the least difference refers to a hamming difference between binary histograms of point distributions of the adjusted overlap region sample and the first or second overlap region, wherein the hamming distances were already established and used to match principal axes to overlap region samples.

\* \* \* \* \*